United States Patent
Ahmad et al.

(10) Patent No.: US 12,316,491 B2
(45) Date of Patent: *May 27, 2025

(54) HOME REGION SWITCH

(71) Applicant: Oracle International Corporation, Redwood Shores, CA (US)

(72) Inventors: Arsalan Ahmad, Redmond, WA (US); Martinus Petrus Lambertus van den Dungen, Snohomish, WA (US); Lokesh Gupta, Belmont, CA (US); Girish Nagaraja, Sammamish, WA (US); Nikhil Yograj Vaishnavi, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,967

(22) Filed: Dec. 18, 2023

(65) Prior Publication Data
US 2024/0137268 A1 Apr. 25, 2024

Related U.S. Application Data

(63) Continuation of application No. 18/050,455, filed on Oct. 27, 2022, now Pat. No. 11,876,613.

(60) Provisional application No. 63/273,811, filed on Oct. 29, 2021.

(51) Int. Cl.
*G06F 15/173* (2006.01)
*H04L 41/0803* (2022.01)

(52) U.S. Cl.
CPC .............................. *H04L 41/0803* (2013.01)

(58) Field of Classification Search
CPC ................................................. H04L 41/0803
USPC ........................................................ 709/223
See application file for complete search history.

(56) References Cited

U.S. PATENT DOCUMENTS

| | | | | |
|---|---|---|---|---|
| 7,616,953 B2* | 11/2009 | Hu | ........................ | H04W 8/12 |
| | | | | 455/432.1 |
| 8,489,697 B2* | 7/2013 | Shin | ....................... | H04L 67/52 |
| | | | | 709/224 |
| 9,166,970 B1* | 10/2015 | Dundas | ............... | H04L 63/0823 |
| 9,282,097 B2* | 3/2016 | Agarwal | ................. | G06F 21/41 |
| 9,407,620 B2* | 8/2016 | Miu | ....................... | H04L 63/105 |
| 9,461,996 B2* | 10/2016 | Hayton | ................... | G06F 21/00 |

(Continued)

OTHER PUBLICATIONS

AWS: Denies Access to AWS Based on the Requested Region, Available online at: https: docs.aws.amazon.com/IAM/latest/UserGuide/reference_policies_examples_aws_deny-requested-region. html, Accessed from Internet on Dec. 7, 2021, 1 page.

(Continued)

*Primary Examiner* — Alicia Baturay
(74) *Attorney, Agent, or Firm* — Kilpatrick Townsend & Stockton LLP

(57) ABSTRACT

Approaches of reassigning a home region from a first data center to a second data center as requested by a customer are described herein. The home region is able to implement write operations to a domain, whereas other data centers cannot implement write operations to the domain. The customer can request the home region being reassigned to another data center such that the customer can utilize the other data center to implement write operations to the domain.

20 Claims, 11 Drawing Sheets

(56) References Cited

U.S. PATENT DOCUMENTS

| | | | |
|---|---|---|---|
| 9,536,065 B2* | 1/2017 | Bouse | G06F 21/32 |
| 9,781,122 B1 | 10/2017 | Wilson et al. | |
| 9,838,376 B1 | 12/2017 | Lander et al. | |
| 9,876,803 B2* | 1/2018 | Miu | G06Q 20/02 |
| 9,916,184 B2* | 3/2018 | Jain | H04W 4/029 |
| 10,050,966 B2* | 8/2018 | Hayton | H04L 63/0815 |
| 10,108,794 B2* | 10/2018 | Bouse | G06F 16/2379 |
| 10,135,802 B2* | 11/2018 | Miu | G06F 21/31 |
| 10,169,098 B2* | 1/2019 | Jain | H04W 4/029 |
| 10,255,061 B2 | 4/2019 | Lander et al. | |
| 10,341,410 B2 | 7/2019 | Lander et al. | |
| 10,425,386 B2 | 9/2019 | Wardell et al. | |
| 10,454,940 B2 | 10/2019 | Lander et al. | |
| 10,484,243 B2 | 11/2019 | Cole et al. | |
| 10,484,382 B2 | 11/2019 | Wilson et al. | |
| 10,491,590 B2* | 11/2019 | Brickel | H04L 63/0876 |
| 10,511,589 B2 | 12/2019 | Gangawane et al. | |
| 10,579,436 B2* | 3/2020 | Jain | H04W 4/02 |
| 10,594,684 B2 | 3/2020 | Bansal et al. | |
| 10,616,224 B2 | 4/2020 | Subramanian et al. | |
| 10,715,564 B2 | 7/2020 | Mohamad Abdul et al. | |
| 10,798,165 B2 | 10/2020 | Srinivasan et al. | |
| 10,846,390 B2 | 11/2020 | Subramanian et al. | |
| 10,878,079 B2 | 12/2020 | Vepa et al. | |
| 10,931,656 B2 | 2/2021 | Carru et al. | |
| 11,038,868 B2* | 6/2021 | Miu | G06F 21/6218 |
| 11,055,391 B2* | 7/2021 | Bouse | G06F 16/2379 |
| 11,061,929 B2 | 7/2021 | Xu et al. | |
| 11,165,634 B2 | 11/2021 | Medam et al. | |
| 11,308,132 B2 | 4/2022 | Srinivasan et al. | |
| 11,321,343 B2 | 5/2022 | Srinivasan et al. | |
| 11,563,728 B2* | 1/2023 | Miu | G06Q 20/384 |
| 11,876,613 B2* | 1/2024 | Ahmad | G06F 9/5027 |
| 2012/0303791 A1 | 11/2012 | Calder et al. | |
| 2019/0155937 A1 | 5/2019 | Barve et al. | |
| 2020/0082011 A1* | 3/2020 | Rong | H04L 67/1097 |
| 2020/0264860 A1 | 8/2020 | Srinivasan et al. | |
| 2021/0081252 A1 | 3/2021 | Bhargava et al. | |
| 2021/0084031 A1 | 3/2021 | Lao et al. | |
| 2023/0101337 A1* | 3/2023 | Ahmad | H04L 67/1095 709/201 |

OTHER PUBLICATIONS

Propagating Writes to Region Replicas, Available online at: https://docs.cloudera.com/HDPDocuments/HDP2/HDP-2.6.4/bk_hadoop-high-availability/content/ha-hbase-write-replicas.html, 3 pages, 2021.

Restricting Identities by Domain, Available online at: https://cloud.google.com/resource-manager/docs/organization-policy/restricting-domains, 8 pages, Dec. 3, 2021.

Using Amazon Aurora Global Databases, Available online at: Using Amazon Aurora global databases, Dec. 7, 2021, 1 page.

U.S. Appl. No. 18/050,455, Notice of Allowance mailed on Apr. 27, 2023, 10 pages.

U.S. Appl. No. 18/050,455, Notice of Allowance mailed on Sep. 19, 2023, 10 pages.

Brown et al., How Does Azure Cosmos DB Provide High Availability, Available online at: https://docs.microsoft.com/en-us/azure/cosmos-db/high-availability, Nov. 11, 2021, 12 pages.

Nallathamby, Multi-Region Deployment for WSO2 Identity Server—Part 1, Available online at: https://wso2.com/library/articles/2018/04/multi-region-deployment-for-wso2-identity-server-part-1/, Apr. 2, 2018, 12 pages.

International Application No. PCT/US2022/078939, International Preliminary Report on Patentability mailed on May 10, 2024, 10 pages.

International Application No. PCT/US2022/078939, International Search Report and Written Opinion mailed on Jan. 13, 2023, 13 pages.

Shah, Easier Way to Control Access to AWS Regions Using IAM Policies, Available online at: https:/aws.amazon.com/blogs/securiteasier-way-to-control-access-to-aws-regions-using-iam-policies, Apr. 25, 2018, 2 pages.

* cited by examiner

HOME REGION SWITCH

CROSS-REFERENCE TO RELATED APPLICATIONS

This application is a continuation of U.S. nonprovisional application Ser. No. 18/050,455 entitled "HOME REGION SWITCH," filed on Oct. 27, 2022, which claims priority to U.S. provisional application No. 63/273,811 entitled "HOME REGION SWITCH," filed on Oct. 29, 2021, the disclosures of which are incorporated by reference herein in their entireties for all purposes.

BACKGROUND

A cloud service provider (CSP) provides a variety of services to customers on demand using one or more networks. Accounts can be set up for each of the customers, where the accounts can define services that the customers can access and utilize. The customers can subscribe to one or more regions, where a subscribed customer can utilize services provided by data centers in locations to which the customer is subscribed.

An account associated with a customer can have a defined home region. Services provided by data centers within the home region can implement write operations to a domain (such as an identity domain), while services provided by data centers within other regions may be prevented from implementing write operations to the domain. The home region is generally defined to be one of the regions to which the customer is subscribed on establishment of the account for the customer.

BRIEF SUMMARY

The present disclosure relates generally to an approach for reassignment of a home region from a first region to a second region. Various embodiments are described herein, including methods, systems, non-transitory computer-readable media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure is directed to a method that may include receiving, by a first data center of a cloud service provider (CSP) located in a first geographic region, a request to switch a home region assignment corresponding to an account associated with the request to an indicated data center of the cloud service provider indicated within the request, a data center corresponding to the home region assignment being capable of implementing write operations to a domain. The method may further include updating, by the first data center, a first identity control plane (IDCP) of the first data center to indicate that the indicated data center is assigned the home region assignment for the account, the indicated data center being capable of implementing write operations to the domain at least in response to the first identity control plane being updated, and updating, by the first data center, a second identity control plane of a second data center of the cloud service provider located in a second geographic region to indicate that the indicated data center is assigned the home region assignment. The method may further include causing, by the first data center, presentation of an indication that the indicated data center has been assigned the home region assignment.

An aspect of the present disclosure is directed to one or more non-transitory computer-readable media having instructions stored thereon, wherein the instructions, when executed by one or more processors, may cause the one or more processors to perform operations including receiving a request to switch a home region assignment corresponding to an account associated with the request to an indicated data center of a cloud service provider (CSP) indicated within the request, a data center corresponding to the home region assignment being capable of implementing write operations to a domain. The operations may further include updating a first identity control plane (IDCP) of a first data center of the cloud service provider located in a first geographic region to indicate that the indicated data center is assigned the home region assignment for the account, the indicated data center being capable of implementing write operations to the domain at least in response to the first identity control plane being updated, and updating a second identity control plane of a second data center of the cloud service provider located in a second geographic region to indicate that the indicated data center is assigned the home region assignment. The operations may further include causing presentation of an indication that the indicated data center has been assigned the home region assignment.

An aspect of the present disclosure is directed to a first data center of a cloud service provider located in a first geographic region including memory to store a domain and one or more processors coupled to the memory. The one or more processors may receive a request to switch a home region assignment corresponding to an account associated with the request to an indicated data center of a cloud service provider (CSP) indicated within the request, a data center corresponding to the home region assignment being capable of implementing write operations to a domain. The one or more processors may further update a first identity control plane (IDCP) of the first data center to indicate that the indicated data center is assigned the home region assignment for the account, the indicated data center being capable of implementing write operations to the domain at least in response to the first identity control plane being updated, and update a second identity control plane of a second data center of the cloud service provider located in a second geographic region to indicate that the indicated data center is assigned the home region assignment. The one or more processors may further cause presentation of an indication that the indicated data center has been assigned the home region assignment.

The foregoing, together with other features and embodiments will become more apparent upon referring to the following specification, claims, and accompanying drawings.

DETAILED DESCRIPTION

Figure 1:
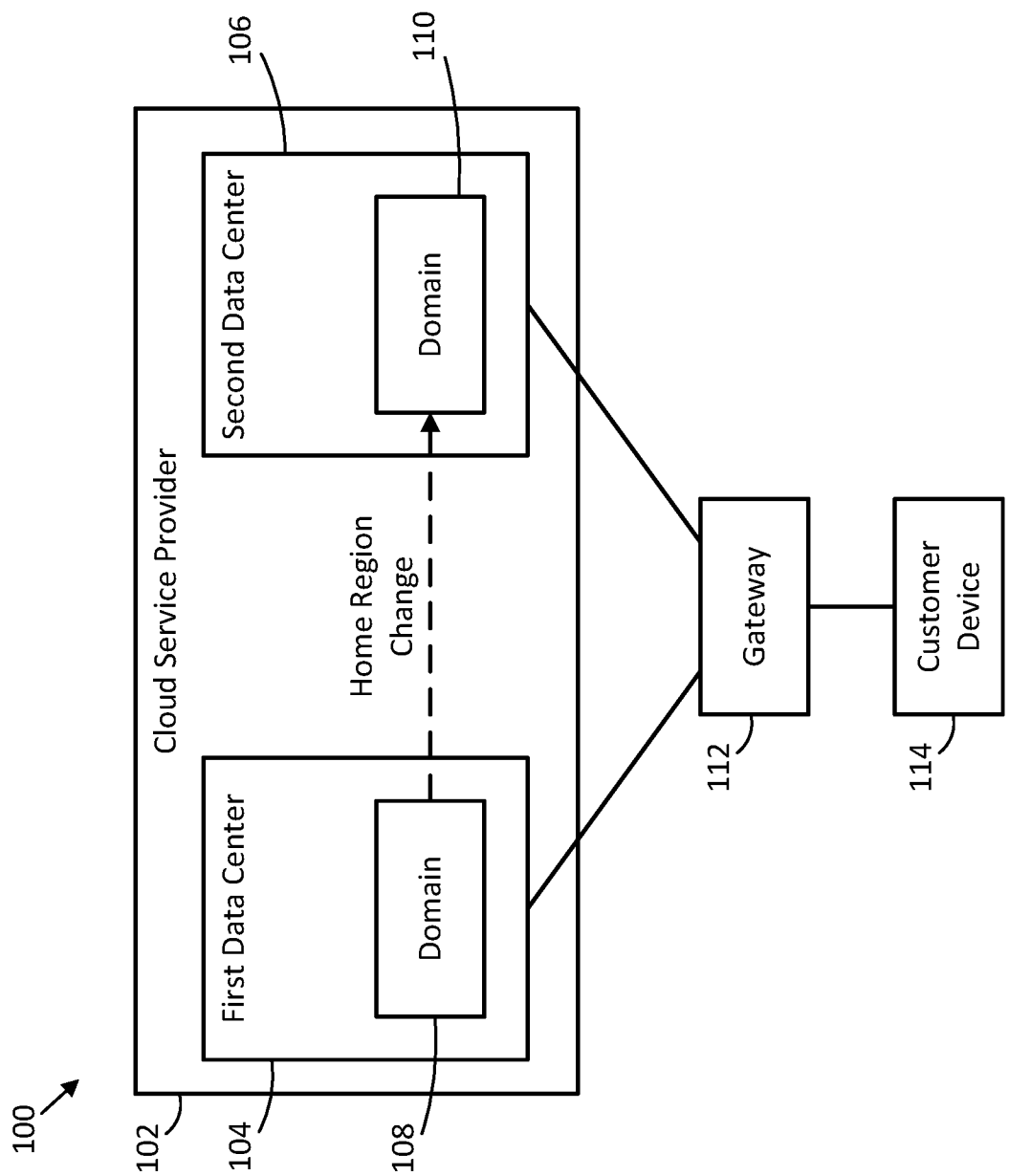
FIG. 1 illustrates an example cloud service provider (CSP) arrangement, according to at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

A cloud service provider (CSP) may provide multiple cloud services to subscribing customers. These services may be provided under different models including a Software-as-a-Service (SaaS), Platform-as-a-Service (PaaS), an Infrastructure-as-a-Service (IaaS) model, and others.

In the cloud environment, an identity management system is generally provided by the CSP to control user access to resources provided or used by a cloud service. Typical services or functions provided by an identity management system include, without restriction, single-sign on capabilities for users, authentication and authorization services, and other identity-based services.

The resources that are protected by an identity management system can be of different types such as compute instances, block storage volumes, virtual cloud networks (VCNs), subnets, route tables, various callable APIs, internal or legacy applications, and the like. These resources include resources stored in the cloud and/or customer on-premise resources. Each resource is typically identified by a unique identifier (e.g., an ID) that is assigned to the resource when the resource is created.

A CSP may provide two or more two separate and independent identity management systems for their cloud offerings. This may be done, for example, where a first identity management system or platform (e.g., Infrastructure Identity and Access Management (IAM)) may be provided for controlling access to cloud resources for IaaS applications and services provided by the CSP. Separately, a second identity management system or platform (e.g., Identity Cloud Services (IDCS)) may be provided for security and identity management for SaaS and PaaS services provided by the CSP.

As a result of providing such two separate platforms, if a customer of the CSP subscribes to both a SaaS or PaaS service and an IaaS service provided by the CSP, the customer generally has two separate accounts—one account with IAM for the IaaS subscription and a separate account with IDCS for the PaaS/SaaS subscription. Each account will have its own credentials, such as user login, password, etc. The same customer thus has two separate sets of credentials for the two accounts. This results in an unsatisfactory customer experience. Additionally, having two separate identity management systems also creates obstacles for interactions between SaaS/PaaS and IaaS services.

For purposes of this application, and as an example, the two platforms are referred to as IAM and IDCS. These names and terms are however not intended to be limiting in any manner. The teachings of this disclosure apply to any situation where two (or more) different identity management systems are to be integrated. The identity management systems, services, or platforms to be integrated may be provided by one or more CSPs.

In certain embodiments, an integrated identity management platform (referred to as Integrated Identity Management System (IIMS)) is provided that integrates the multiple identity management platforms (e.g., IAM and IDCS platforms) in a manner that is transparent to the users or customers of the cloud services while retaining and offering the various features and functionalities offered by the two separate (e.g., IAM and IDCS) platforms. The integration thus provides a more seamless and enhanced user experience.

This integration however is technically very difficult for several reasons. The two platforms may use different procedures and protocols for implementing the identity-related functions. IAM may, for example, be an attribute-based access control (ABAC) system, also known as policy-based access control system, which defines an access control paradigm whereby access rights are granted to users through the use of policies that express a complex Boolean rule set that can evaluate many different attributes. The purpose of ABAC is to protect objects such as data, network devices, and IT resources from unauthorized users and actions—those that do not have "approved" characteristics as defined by an organization's security policies. On the other hand, IDCS may be a role-based access control (RBAC) system which is a policy-neutral access-control mechanism defined around roles and privileges. The components of RBAC such as role-permissions, user-role and role-role relationships make it simple to perform user assignments. As yet another reason, the authentication and authorization frameworks or workflows (e.g., types of tokens that are used, different authentication frameworks such as OAUTH, etc.) used by the two platforms may be different. This is just a small sampling of reasons why providing an integrated solution is technically very difficult.

Techniques for customer and/or client (which is referred to collectively as a customer throughout the disclosure) to switch a home region of a CSP are described herein. For example, a CSP may include one or more data centers (which also may be referred to as regions), where each data center may be located in a corresponding geographic area serviced by the CSP. For example, a first data center may be located in a first geographic area serviced by the CSP and a second data center may be located in a second geographic area service by the CSP, where the second geographic area is different from the first geographic area. Each data center may comprise computer hardware and/or software that can provide one or more services to customers. The data centers may comprise one or more domains, such as identity domains. In some embodiments, a domain may comprise a container that includes data, such as data that indicates access information for the customer and/or services that can be provided to the customer.

Any given domain may be duplicated in multiple data centers within the CSP. The customer may have a defined home region for a domain (which may be referred to as a domain home region), which provides the customer more rights for the domain than other regions. For example, the home region for a domain may be a data center where updates to customer identity related information (such as users, groups, apps, etc.) is allowed. The customer may wish to switch this home region for the domain to one of the data centers in which the domain has been duplicated. For example, the customer may request the CSP to switch the domain home region from a first data center to a second data center. The customer may be able to request the switch of the domain home region from a first data center to a second data center when the first data center and the second data center are both available, when the first data center is unavailable (for example, the data center may be down or services within the data center may be unreachable) and the second data center is available, or when the first data center is available and the second data center is unavailable. According to various embodiments, the CSP switches the domain home region of the customer based on the request from the customer. In particular, the domain home region may be indicated in identity control planes (IDCPs) (which may be distributed command line interfaces) of the data centers to indicate which data center is the domain home region. The CSP may update the IDCPs of the first data center and the second data center to indicate that the second data center is the new domain home region. Accordingly, the CSP may allow the customer to switch a domain home region and, in some embodiments, may allow the customer to switch the domain home region on the fly.

In some embodiments, the CSP may limit the amount of times that a domain home region can be switched, such as limiting a customer to a maximum number of switches within a time period. For example, the CSP may keep a count of a number of domain home region switches requested within a current period of time for a given customer and prevent further domain home region switches when the number of domain home region switches exceeds the maximum number of switches within the current time period.

When switching the domain home region from a first data center to a second data center, the write operations between the first data center and the second data center may not be synchronized in time. For example, there may be a time delay between when a write operation is implemented to a domain in the first data center and when the replicated domain in the second data center is updated that can cause write operations to be implemented in the domain in the first data center and not be implemented in the replicated domain in the second data center. Further, if the first data center is unavailable when the domain home region switch is made to the second data center, the first data center may not have written operations replicated to the domain in the first data center that were implemented to the domain in the second data center based on the first data center being unavailable. In some embodiments, the CSP may indicate to the customer that one or more write operations may be lost during the switching period, which may indicate to the customer that one or more write operations may be repeated upon completion of the switch and/or which write operations may be repeated. In some embodiments, the CSP may perform reconciliation between the first data center and the second data center once the switch is completed and/or once any of the data centers that were unavailable during the switch become available. For example, the CSP may compare snapshots of the first data center and the second data center to determine which write operations, if any, are missing from either of the data centers, and determine whether the write operations are to be added to the data center that is missing the write operations. Accordingly, the CSP may be able to deal with any write operations that are missing due to the domain home region switch.

FIG. 1 illustrates an example CSP arrangement 100, according to at least one embodiment. The CSP arrangement 100 illustrates an example of a portion of a CSP that can provide services to a customer. The CSP may be accessed by one or more customer devices to utilize services provided by the CSP.

The CSP arrangement 100 may include a CSP 102. The CSP may comprise a network of computer hardware implementing software that can provide services to customers. The computer hardware and/or the software of the CSP 102 may be referred to as resources, where a customer may utilize or request the resources to perform operations. The CSP 102 may include an IAM, where the IAM may control access of users to the CSP 102.

The hardware and/or the software of the CSP 102 may be separated into one or more data centers. Each of the data centers may be located in a corresponding geographic region. For example, the CSP 102 may include a first data center 104 and a second data center 106. The first data center may be located in a first geographic region and the second data center may be located in a second geographic region, the second geographic region being different than the first geographic region. Each of the data centers may comprise computer hardware and software to provide services to customers. In some embodiments, each of the data centers may include one or more servers.

The data centers may store one or more domains. In some instances, one or more domains may be replicated in multiple regions. For example, multiple data centers in different regions may store copies of a same domain. In the illustrated embodiment, the first data center 104 may store a first copy of a domain 108 and the second data center 106 may store a second copy of the domain 110.

The CSP arrangement 100 may include a gateway 112. The gateway 112 may be coupled to one or more data centers of the CSP 102. The gateway 112 may provide access to the data centers to which the gateway 112 is coupled. In the illustrated embodiment, the gateway 112 is coupled to the first data center 104 and the second data center 106. The gateway 112 may be able to establish connections between customer devices and the regions. The data centers coupled to the gateway 112 may correspond to unique domain name system (DNS) addresses. For example, the first data center 104 may correspond to a first DNS address and the second data center 106 may correspond to a second DNS address. In response to the gateway 112 receiving a request from a device that indicates a DNS address, the gateway 112 may establish a connection between the device and the data center corresponding to the DNS address.

The CSP arrangement 100 may include a customer device 114. The customer device 114 may comprise a computer device. The customer device 114 may be operated by a customer. The customer may be subscribed with one or more data centers of the CSP 102. For example, the customer may be subscribed to the first data center 104 and the second data center 106 in the illustrated embodiment. The customer may be able to utilize one or more of the services provided by the data centers to which the customer is subscribed. For example, the customer may be able to utilize one or more of the services provided by the first data center 104 and the second data center 106. The CSP 102 may maintain an account that indicates the data centers to which the customer is subscribed and/or additional information related to the customer. The account may further include information that can be utilized for authorizing the customer to access the CSP 102.

Each customer may have a defined home region. In particular, the customer may have one of the data centers to which the customer is subscribed assigned with a home region assignment that defines the data center as the home region for the customer. In legacy approaches, the home region was assigned at the generation of the account and could not be reassigned by the customer after the generation of the account. The home region of a customer may allow different rights than other regions. For example, the home region may be the data center from which the customer may have write operations implemented for one or more defined domains, whereas the other data centers may be prevented from implementing write operations for the customer for the one or more defined domains. In the illustrated embodiment, the customer has the first data center 104 defined as the home region. In this example, the customer is limited to having write operations implemented to the first copy of the domain 108 by the first data center 104 based on the customer having the first data center 104 defined as the home region. Further, the customer is prevented from having write operations implemented to the second copy of the domain 110 by the second data center 106 based on the second data center 106 not being assigned the home region. However, the customer may want to reassign the home region in some instances, such as when the first data center 104 becomes unavailable for some reason.

The customer may transmit a request to reassign the home region from the first data center 104 to the second data center 106 via the customer device 114. The customer device 114 may transmit the request to the gateway 112 along with a DNS address corresponding to a data center which is to perform the reassignment of the home region assignment. For brevity, the first data center 104 is described herein as performing the reassignment of the home region assignment, although it should be understood that another data center of the CSP 102, such as the second data center 106, may perform the reassignment of the home region assignment in a similar manner to the performance of the reassignment performed by the first data center 104 described herein.

For example, the DNS address transmitted with the request may correspond to the first data center 104 in the described embodiment. The gateway 112 may receive the request from the customer device 114. The gateway 112 may determine that the request is to be provided to the first data center 104 based on the DNS address corresponding to the first data center 104 included with the request. The gateway 112 may provide the request to the first data center 104.

The first data center 104 may identify the request received from the gateway 112. Based on the request, the first data center 104 may determine that the home region assignment is to be reassigned from the first data center 104 to the second data center 106, thereby causing the second data center 106 to be assigned as the home region. The first data center 104 may have a first IDCP that indicates which data center is assigned to be the home region for the customer. In the illustrated embodiment, the first IDCP indicates that the first data center 104 is the home region. Based on the request, the first data center 104 may determine that the first IDCP is to be updated to indicate that the second data center 106 is the home region. The first data center 104 may update the first IDCP to indicate that the second data center 106 is the home region. The first data center 104 may prevent write operations from the customer to be implemented to the first copy of the domain 108 after updating the first IDCP to indicate that the second data center 106 is the home region.

The second data center 106 may have a second IDCP that indicates which data center is assigned to be the home region for the customer. In the illustrated embodiment, the second IDCP may indicate that the first data center 104 is the home region. Based on the request, the first data center 104 may determine that the second IDCP is to be updated to indicate that the second data center 106 is the home region. The first data center 104 may update the second IDCP to indicate that the second data center 106 is the home region. According to various embodiments, the second data center 106 prevents write operations from the customer to be implemented to the second copy of the domain 110 prior to the update of the second IDCP, and the second data center 106 allows write operations from the customer to be implemented to the second copy of the domain 110 once the update of second IDCP has been completed.

Based on the first IDCP and the second IDCP being updated, the first data center 104 may indicate to the customer that the home region has been updated to the second data center 106. For example, the first data center 104 may provide an indication that the reassignment of the home region has been completed to the gateway 112. For example, the first data center 104 may provide an indication that the assignment of the home region to the second data center 106 has been completed. The gateway 112 may provide the indication to the customer device 114. The customer device 114 may display the indication that the home region has been updated to the second data center 106.

Accordingly, the CSP 102 allowed the customer to update the home region to the second data center 106 for the customer. The first IDCP and the second IDCP may maintain the second data center 106 as the home region until another home region assignment is performed. Accordingly, the customer may continue to utilize the second data center 106 to implement write operations to the second copy of the domain 110 until another home region assignment is performed.

Figure 2:
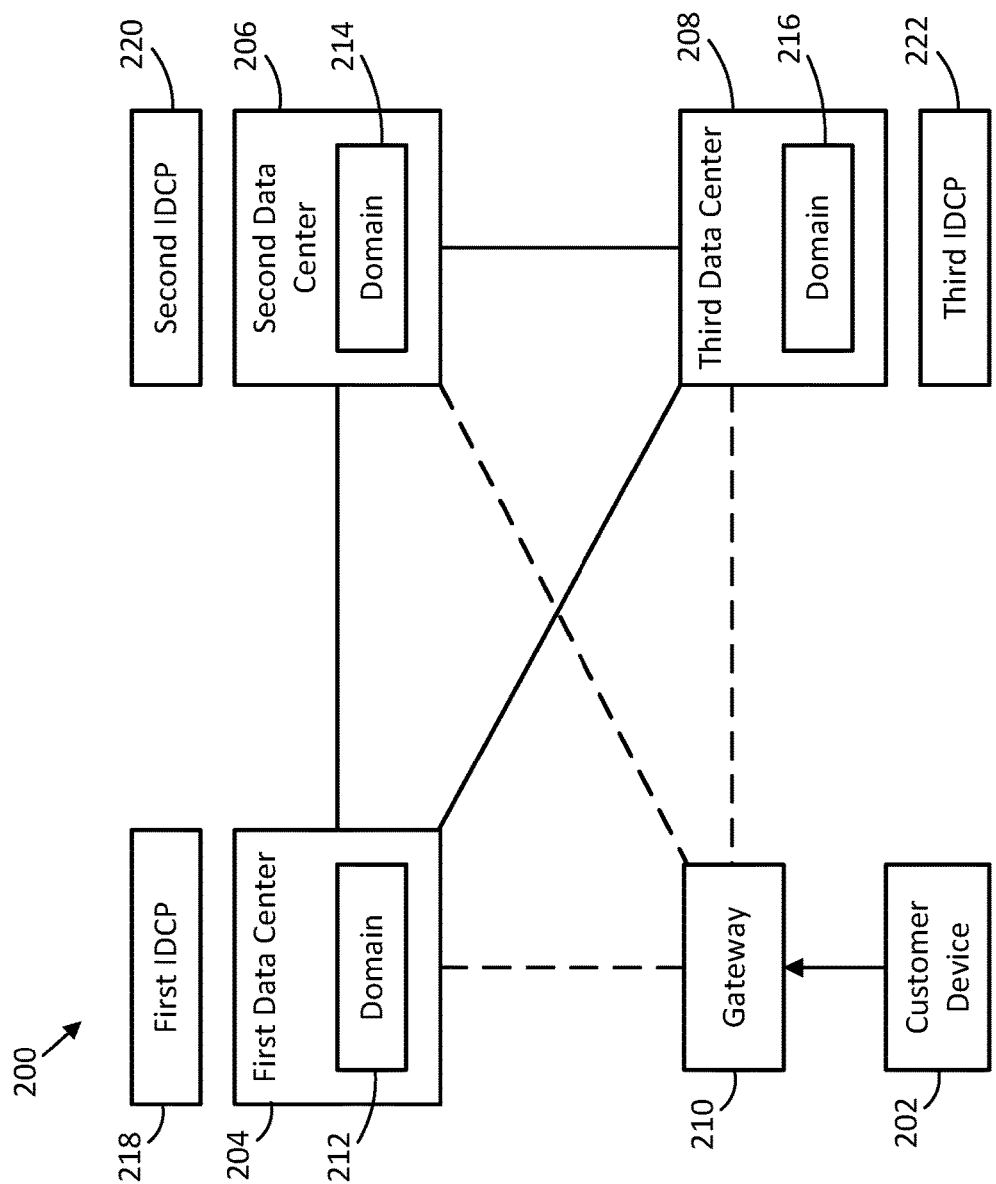
FIG. 2 illustrates another example CSP arrangement, according to at least one embodiment.

FIG. 2 illustrates another example CSP arrangement 200, according to at least one embodiment. The CSP arrangement 200 illustrates an example of a portion of a CSP that can provide services to a customer. The CSP may be accessed by one or more customer devices to allow the customer devices to utilize the services provided by the CSP.

The CSP arrangement 200 may include a customer device 202. The customer device 202 may include one or more of the features of the customer device 114 (FIG. 1). The customer device 202 may comprise a computer device. The customer device 202 may be utilized by a customer to access the CSP and utilize one or more services provided by the CSP. The CSP may maintain an account associated with a customer that can indicate the services provided by the CSP that the customer can utilize.

In the illustrated embodiment, the CSP may include a first data center 204, a second data center 206, and a third data center 208. The first data center 204, the second data center 206, and the third data center 208 may each include one or more of the features of the first data center 104 (FIG. 1) and/or the second data center 106 (FIG. 1). The customer utilizing the customer device 202 may be subscribed to one or more data centers of the CSP. The customer may be subscribed to the first data center 204, the second data center 206, and the third data center 208 in the illustrated embodiment. The account associated with the customer may indicate that the customer is subscribed to the first data center 204, the second data center 206, and the third data center 208.

Based on the subscription to the first data center 204, the second data center 206, and the third data center 208, the customer device 202 may be able to utilize one or more services provided by the first data center 204, the second data center 206, and the third data center 208. The CSP arrangement 200 may include a gateway 210. The gateway 210 may be coupled to the first data center 204, the second data center 206, and the third data center 208. The gateway 210 may facilitate the customer device 202 in accessing the first data center 204, the second data center 206, and the third data center 208. Each of the first data center 204, the second data center 206, and the third data center 208 may be associated with corresponding DNS addresses. For example, the first data center 204 may be associated with a first DNS address, the second data center 206 may be associated with a second DNS address, and the third data center may be associated with a third DNS address. The gateway 210 may be able to determine which data center a customer device 202 is attempting to access based on the DNS address provided with the communications from the customer device 202. The gateway 210 may establish a connection between the customer device 202 and a data center based on the DNS address indicated by the customer device 202.

One or more domains associated with the customer may be stored on one or more of the data centers to which the customer is described. Further, a domain associated with the customer may be replicated across multiple data centers, where each of the data centers on which the domain is to be replicated stores a copy of the domain. In the illustrated embodiment, the customer may have a domain replicated across the first data center 204, the second data center 206, and the third data center 208. In particular, the first data center 204 may store a first copy of the domain 212, the second data center 206 may store a second copy of the domain 214, and the third data center 208 may store a third copy of the domain 216.

Each of the data centers may have a corresponding IDCP. For example, the first data center 204 may have a first IDCP 218, the second data center 206 may have a second IDCP 220, and the third data center 208 may have a third IDCP 222. While the IDCPs are shown separate from the corresponding data centers, it should be understood that the IDCPs may be included in the corresponding data centers in other embodiments. The IDCPs may store information related to the customer.

The CSP may allow a single home region to be defined for a customer. The home region may be defined to be a data center at which the customer may have write operations implemented to one or more domains in the home region, while the other data centers that are not assigned to be the home region may be prevented from implementing write operations to the one or more domains requested by the customer. Each of the IDCPs may store an indication of the data center which is assigned as the home region. In the illustrated embodiment, the first data center 204 may be defined as the home region. Accordingly, the first IDCP 218, the second IDCP 220, and the third IDCP 222 each stores an indication that the first IDCP 218 is assigned as the home region.

Since the first data center 204 is assigned as the home region, the first data center 204 is able to implement the write operations to the first copy of the domain 212 requested by the customer device 202. The second data center 206 may be prevented from implementing write operations to the second copy of the domain 214 requested by the customer and the third data center 208 may be prevented from implementing write operations to the third copy of the domain 216. Accordingly, the customer may be able to request write operations to be implemented to the first copy of the domain 212, and may be prevented from having requested write operations implemented directly to the second copy of the domain 214 and the third copy of the domain 216.

The home region may be able to update the replicated domains in other data centers to match the copy of the domain stored in the home region. The home region may update the replicated domains at set intervals, in response to a trigger, or some combination thereof. For example, the first data center 204, being assigned as the home region in the illustrated embodiment, updates the second copy of the domain 214 and the third copy of the domain 216 to match the first copy of the domain 212. As the update may be performed at set intervals and/or in response to a trigger, there is a chance that the first copy of the domain 212 may be different than the second copy of the domain 214 and the third copy of the domain 216 based on a delay that may occur between the time that the first data center 204 implements a write operation to the first copy of the domain 212 and the time that the first data center 204 updates the second copy of the domain 214 and/or the third copy of the domain 216.

As a customer has only one home regions and the other data centers have limited operation, there may be times that the customer would like to reassign the home region assignment to a different data center to assign the other region as the home region. For example, the customer may want to change the home region assignment when the data center assigned as the home region is unavailable (such as during updates, during connection issues, and/or during other system issues). The CSP may allow the customer to reassign the home region assignment to different data centers, as described further throughout this disclosure. The CSP may allow the customer to reassign the home region assignment when all of the data centers are available or when one or more of the data centers (including data center assigned as the home region) is unavailable. Allowing the customer to reassign the home region assignment can be beneficial to the customer.

In some embodiments, the CSP may limit the home region reassignments performed by a customer. For example, the CSP may limit an amount of times that the customer reassigns the home region assignment within a certain period of time. In some of these embodiments, the CSP may allow the customer to reassign the home region assignment if the data center currently assigned the home region assignment is unavailable whether or not the amount of times that the customer reassigned the home region assignment exceeds the threshold amount of times.

Figure 3:
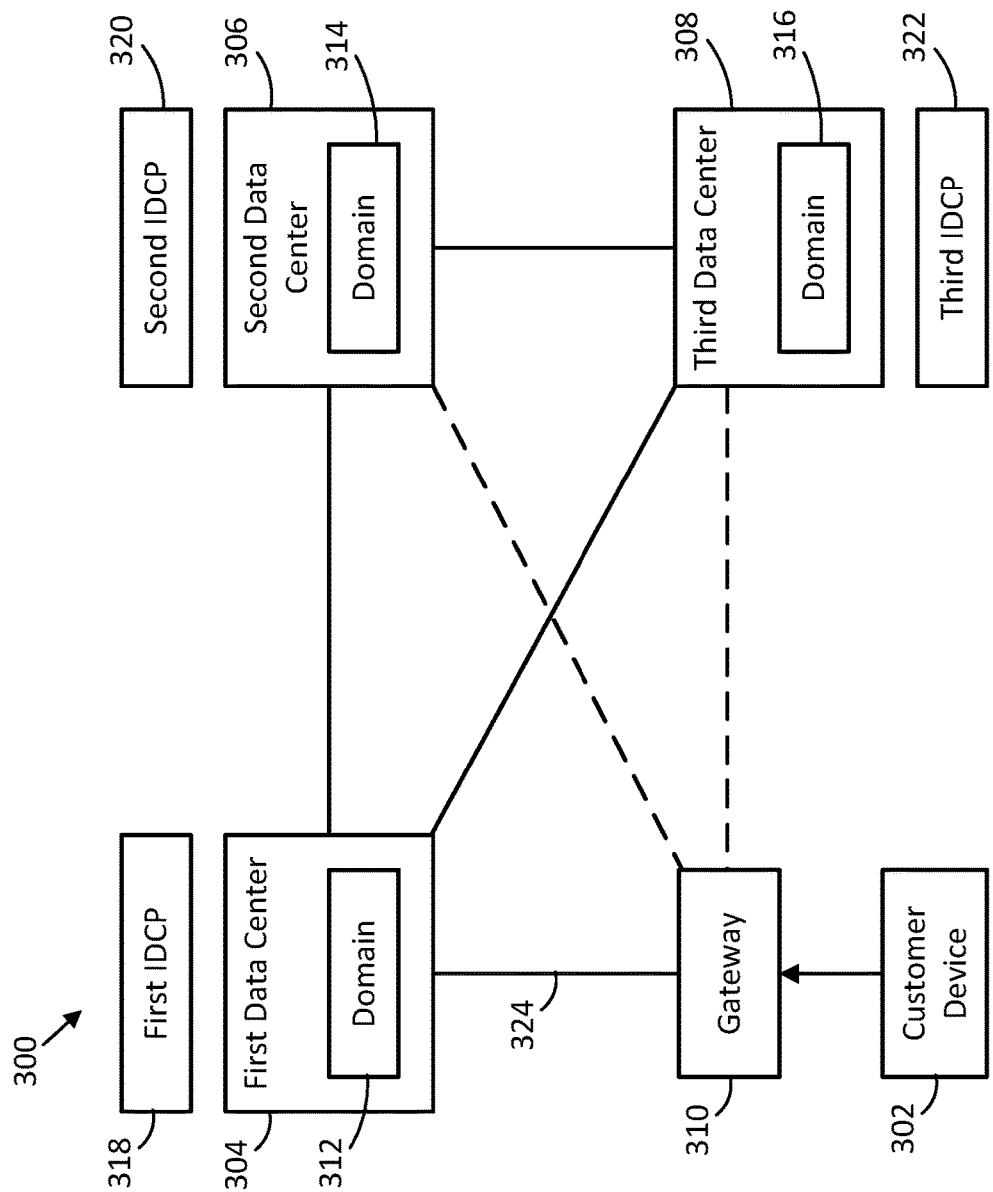
FIG. 3 illustrates another example CSP arrangement, according to at least one embodiment.

FIG. 3 illustrates another example CSP arrangement 300, according to at least one embodiment. The CSP arrangement 300 illustrates an example of a reassignment of a home region assignment with the subscribed data centers available.

The CSP arrangement 300 may include one or more of the features of the CSP arrangement 200 (FIG. 2). For example, the CSP arrangement 300 may include a customer device 302. The customer device 302 may include one or more of the features of the customer device 202 (FIG. 2). The customer device 302 may be utilized by a customer to access a CSP of the CSP arrangement 300. The CSP may maintain an account for the customer.

The CSP arrangement 300 may include a CSP. The CSP may include a first data center 304, a second data center 306, and a third data center 308 in the illustrated embodiment. The first data center 304, the second data center 306, and the third data center 308 may include one or more of the features of the first data center 204 (FIG. 2), the second data center 206 (FIG. 2), and/or the third data center 208 (FIG. 2). In the illustrated embodiment, the first data center 304 may be assigned to be the home region.

The first data center 304 may store a first copy of a domain 312, the second data center 306 may store a second copy of the domain 314, and the third data center 308 may store a third copy of the domain 316. The first copy of the domain 312, the second copy of the domain 314, and the third copy of the domain 316 may include one or more of the features of the first copy of the domain 212 (FIG. 2), the second copy of the domain 214 (FIG. 2), and/or the third copy of the domain 216 (FIG. 2). The first copy of the domain 312, the second copy of the domain 314, and the third copy of the domain 316 may be associated with the customer operating the customer device. The CSP may allow write operations implemented from customer requests to the domain in the home region while the other regions may be limited from implementing operations to the domain from customer requests. Accordingly, since the first data center 304 is assigned as the home region, the first data center 304 may implement write operations from the customer to the first copy of the domain 312, whereas the second data center 306 may be prevented from implementing write operations from the customer to the second copy of the domain 314 and the third data center 308 may be prevented from implementing write operations from the customer to the third copy of the domain 316.

Each of the data centers may have a corresponding IDCP. In the illustrated embodiment, the first data center 304 may have a first IDCP 318, the second data center 306 may have a second IDCP 320, and the third data center 308 may have a third IDCP 322. Each of the first IDCP 318, the second IDCP 320, and the third IDCP 322 may include one or more of the features of the first IDCP 218 (FIG. 2), the second IDCP 220 (FIG. 2), and/or the third IDCP 222 (FIG. 2). Each of the IDCPs may store information related to the customer, such as a data center that has been assigned the home region assignment for the customer.

The corresponding data center may access the corresponding IDCP to retrieve the information related to the customer. For example, the first IDCP 318, the second IDCP 320, and the third IDCP 322 may store an indication that the first data center 304 is assigned the home region assignment for the customer in the illustrated embodiment, thereby causing the first data center 304 to act as the home region for the customer. The first data center 304 may access the first IDCP 318 to determine that the first data center 304 is assigned the home region assignment for the customer, the second data center 306 may access the second IDCP 320 to determine that the first data center 304 is assigned the home region assignment for the customer, and the third data center 308 may access the third IDCP 322 to determine that the first data center 304 is assigned the home region assignment for the customer. Each of the data centers may access the corresponding IDCP to determine which data center has been assigned as the home region for the customer upon receiving a write operation request from the customer. The data center may implement or not implement the write operation request based on which data center is assigned as the home region. For example, the first data center 304 may access the first IDCP 318 to determine that the first data center 304 is assigned as the home region and the first data center 304 may implement the requested write operation to the first copy of the domain 312 based on the first data center 304 being assigned as the home region. The second data center 306 may access the second IDCP 320 to determine that the first data center 304 is assigned as the home region and the second data center 306 may prevent the requested write operation from being implemented to the second copy of the domain 314 based on the second data center 306 not being assigned as the home region. Further, the third data center 308 may access the third IDCP 322 to determine that the first data center 304 is assigned as the home region and the third data center 308 may prevent the requested write operation from being implemented to the third copy of the domain 316 based on the third data center 308 not being assigned as the home region.

The CSP arrangement 300 may include a gateway 310. The gateway 310 may include one or more of the features of the gateway 210 (FIG. 2). The gateway 310 may establish connections between the customer device 302 and the first data center 304, between the customer device 302 and the second data center 306, and between the customer device 302 and the third data center 308. The first data center 304, the second data center 306, and the third data center 308 may each be associated with unique DNS addresses. For example, the first data center 304 may be associated with a first DNS address, the second data center 306 may be associated with a second DNS address, and the third data center 308 may be associated with a third DNS address. The gateway 310 may establish connections and/or route transmissions in accordance with a DNS address included with a connection establishment request and/or a transmission. For example, the gateway 310 may establish connections and/or route transmissions to the first data center 304 based on the first DNS address being provided, may establish connections and/or route transmissions to the second data center 306 based on the second DNS address being provided, and may establish connections and/or route transmissions to the third data center 308 based on the third DNS address being provided.

The customer may request the home region assignment to be reassigned. In the illustrated embodiment, the first data center 304, the second data center 306, and the third data center 308 may be available when the reassignment of the home region assignment is requested. For brevity, the reassignment of the home region assignment is described as being performed by the customer device 302 providing the request to the first data center 304 and the first data center 304 performing the reassignment of the home region assignment. It should be understood that the procedure may be performed similarly with any of the available data centers (including the second data center 306 and the third data center 308). Further, the procedure is described as reassignment of the home region assignment from the first data center 304 to the second data center 306, although it should be understood that the home region assignment may be reassigned to any data center to which the customer is subscribed in other instances.

The customer may input a request to the customer device 302 to change reassign a home region assignment to one of the data centers to which the customer is subscribed. In the described embodiment, the customer may request that the home region assignment be reassigned to the second data center 306. The customer device 302 may generate a request transmission that indicates that the home region assignment is to be reassigned to the second data center 306. In some embodiments, the request transmission may include a DNS address corresponding to the data center intended to perform the home region assignment reassignment operation. For example, the request transmission may include the first DNS address corresponding to the first data center 304. The customer device 302 may transmit the request transmission to the gateway 310.

The gateway 310 may establish a connection between the customer device 302 and the first data center 304, as illustrated by transmission line 324 between the gateway 310 and the first data center 304 being solid. The connection may have been previously established based on a request from the customer device 302 to establish the connection or may be established based on the first DNS address corresponding to the first data center 304 included in the request transmission received from the customer device 302. The gateway 310 may provide the request transmission to the first data center 304 based on the connection.

The first data center 304 may receive the request transmission from the gateway 310. Based on the request transmission, the first data center 304 may determine that the home region assignment is to be reassigned to the second data center 306. In particular, since the first data center 304 is currently assigned as the home region, the first data center 304 may determine that the home region assignment is to be reassigned from the first data center 304 to the second data center 306.

Based on the determination that the home region assignment is to be reassigned to the second data center 306, the first data center 304 may update the first IDCP 318 to indicate that the second data center 306 is the home region. For example, the first data center 304 may access the first IDCP 318 and replace the indication that the first data center 304 is assigned the home region assignment with an indication that the second data center 306 is assigned the home region assignment. In some embodiments, the first IDCP 318 may store a field with a value that indicates which data center is the home region, where the reassignment of the home region assignment may cause the value of the field to be updated from a value corresponding to the first data center 304 to a value corresponding to the second data center 306. Once the first IDCP 318 has been updated, the first IDCP 318 may indicate to the first data center 304 that the second data center 306 is the home region when accessed by the first data center 304.

Prior to the update of the home region assignment to the second data center 306, the first data center 304 may have been assigned as the home region. While the first data center 304 was assigned as the home region, the first data center 304 may have been able to implement write operations from the customer to the first copy of the domain 312. Once the first IDCP 318 has been updated to indicate that the second data center 306 is assigned as the home region, the first data center 304 may determine that it is no longer the home region based on accessing the first IDCP 318. While the first data center 304 is not assigned as the home region, the first data center 304 may be prevented from implementing write operations from the customer to the first copy of the domain 312. Accordingly, the first data center 304 may be prevented from implementing write operations from the customer to the first copy of the domain 312 in response to the first IDCP 318 being updated to indicate that the second data center 306 is assigned the home region assignment.

The first data center 304 may also update the second IDCP 320 to indicate that the second data center 306 is assigned as the home region. For example, the first data center 304 may transmit a request to the second IDCP 320 to reassign the home region assignment to the second data center 306. In some embodiments, the first data center 304 may transmit the request to the second IDCP 320 via the second data center 306. The indication of the first data center 304 being assigned the home region assignment stored in the second IDCP 320 may be updated to an indication that the second data center 306 is assigned the home region assignment. In some embodiments, the second IDCP 320 may store a field indicating which data center is assigned the home region assignment, where the update causes a value of the field to be updated from the value corresponding to the first data center 304 to the value corresponding to the second data center 306.

Prior to the update of the home region assignment to the second data center 306, the second data center 306 may not have been assigned as the home region. While the second data center 306 was not assigned as the home region, the second data center 306 may have been prevented from implementing write operations from the customer to the second copy of the domain 314. Once the second IDCP 320 has been updated to indicate that the second data center 306 is assigned as the home region, the second data center 306 may determine that it is the home region based on accessing the second IDCP 320. While the second data center 306 is assigned as the home region, the second data center 306 may be able to implement write operations from the customer to the second copy of the domain 314. Accordingly, the second data center 306 may be able to implement write operations from the customer to the second copy of the domain 314 in response to the second IDCP 320 being updated to indicate that the second data center 306 is assigned the home region assignment.

Further, the first data center 304 may update the third IDCP 322 to indicate that the second data center 306 is assigned as the home region. For example, the first data center 304 may transmit a request to the third IDCP 322 to reassign the home region assignment to the second data center 306. In some embodiments, the first data center 304 may transmit the request to the third IDCP 322 via the third data center 308. The indication of the first data center 304 being assigned the home region assignment stored in the third IDCP 322 may be updated to an indication that the second data center 306 is assigned the home region assignment. In some embodiments, the third IDCP 322 may store a field indicating which data center is assigned the home region assignment, where the update causes a value of the field to be updated from the value corresponding to the first data center 304 to the value corresponding to the second data center 306.

The first data center 304 may provide an indication to the customer device 302 that the reassignment of the home region assignment to the second data center 306 has been completed. In some embodiments, the first data center 304 may provide the indication to the customer device 302 upon completion of the update of the first IDCP 318. In other embodiments, the first data center 304 may provide the indication to the customer device 302 in response to the update of the first IDCP 318, the second IDCP 320, and the third IDCP 322 all being completed. For example, the first data center 304 may wait to receive indications from the second IDCP 320 and the third IDCP 322 that the reassignment of the home region assignment has been completed before providing the indication to the customer device 302. In response to receiving the indication, the customer device 302 may display an indication to the customer that the reassignment of the home region assignment has been completed. In other embodiments, the indication that the reassignment of the home region assignment has been completed may be omitted.

Figure 4:
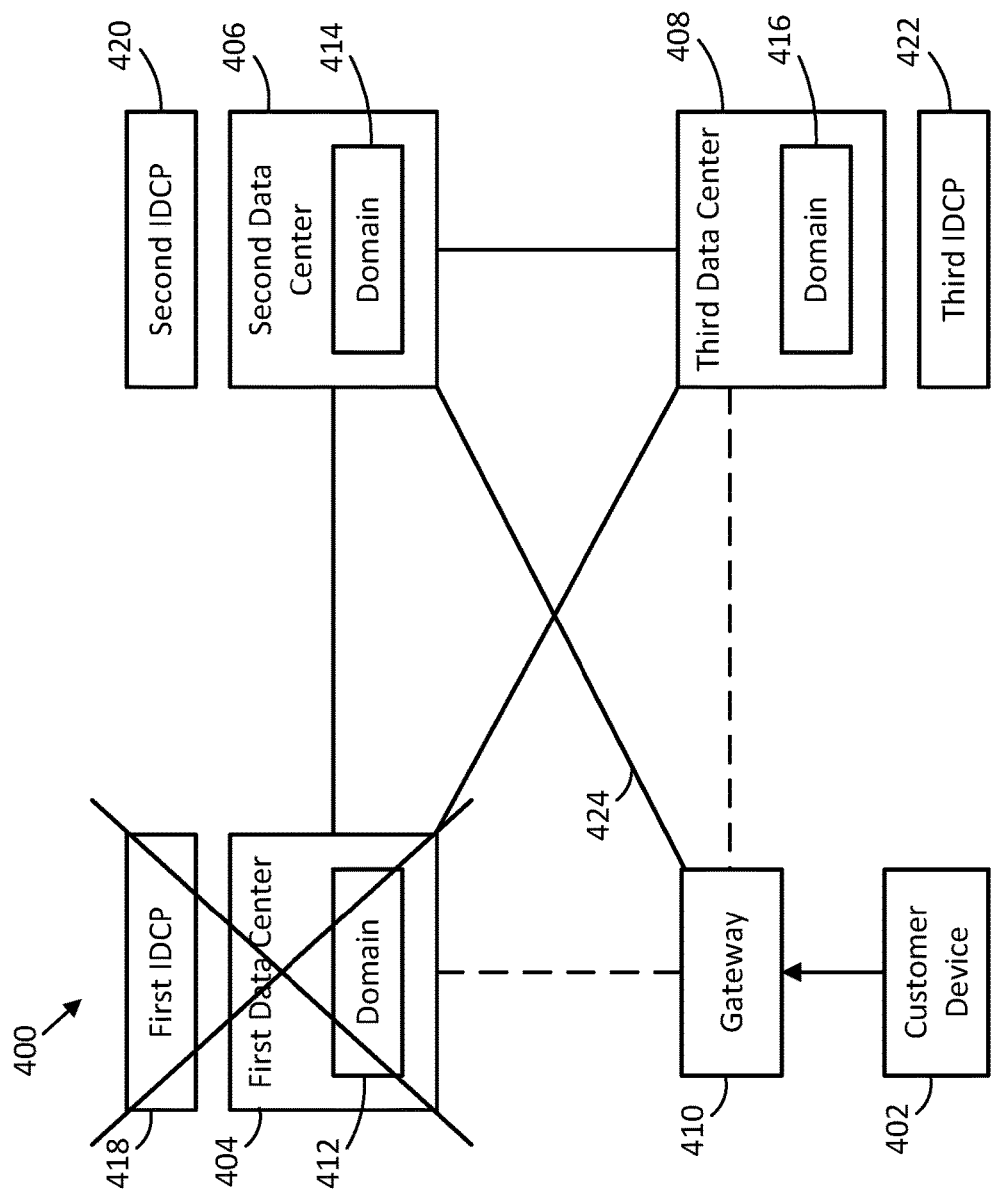
FIG. 4 illustrates another example CSP arrangement, according to at least one embodiment.

FIG. 4 illustrates another example CSP arrangement 400, according to at least one embodiment. The CSP arrangement 400 illustrates an example of a reassignment of a home region assignment with a portion of the subscribed data center being unavailable.

The CSP arrangement 400 may include one or more of the features of the CSP arrangement 200 (FIG. 2) and/or the CSP arrangement 300 (FIG. 3). For example, the CSP arrangement may include a customer device 402. The customer device 402 may include one or more of the features of the customer device 202 (FIG. 2) and/or the customer device 302 (FIG. 3). The customer device 402 may be utilized by a customer to access a CSP of the CSP arrangement 400. The CSP may maintain an account for the customer.

The CSP arrangement 400 may include a CSP. The CSP may include a first data center 404, a second data center 406, and a third data center 408 in the illustrated embodiment. The first data center 404, the second data center 406, and the third data center 408 may include one or more of the features of the first data center 204 (FIG. 2), the first data center 304 (FIG. 3), the second data center 206 (FIG. 2), the second data center 306 (FIG. 3), the third data center 208 (FIG. 2), and/or the third data center 308 (FIG. 3). In the illustrated embodiment, the first data center 404 may be assigned to be the home region. Further, the first data center 404 may be unavailable in the illustrated embodiment, as illustrated by the 'X' over the first data center 404. Accordingly, the customer device 402, the second data center 406, and the third data center 408 may be unable to access the first data center 404.

The first data center 404 may store a first copy of a domain 412, the second data center 406 may store a second copy of the domain 414, and the third data center 408 may store a third copy of the domain 416. The first copy of the domain 412, the second copy of the domain 414, and the third copy of the domain 416 may include one or more of the features of the first copy of the domain 212 (FIG. 2), the first copy of the domain 312 (FIG. 3), the second copy of the domain 214 (FIG. 2), the second copy of the domain 314 (FIG. 3), the third copy of the domain 216 (FIG. 2), and/or the third copy of the domain 316 (FIG. 3). The first copy of the domain 312, the second copy of the domain 314, and the third copy of the domain 316 may be associated with the customer operating the customer device.

The CSP may limit write operations implemented from customer requests to the domain in the home region while the other regions may be limited from implementing operations to the domain from customer requests. Accordingly, since the first data center 404 is assigned as the home region, the first data center 404 may implement write operations from the customer to the first copy of the domain 412, whereas the second data center 406 may be prevented from implementing write operations from the customer to the second copy of the domain 414 and the third data center 408 may be prevented from implementing write operations from the customer to the third copy of the domain 416. Since the first data center 404 is unavailable and is assigned as the home region in the illustrated embodiment, the customer device 402 may be prevented from having any write operations implemented to the domain. In particular, the customer device 402 may be unable to access the first data center 404 due to the first data center 404 being unavailable, which would prevent the first data center 404 from receiving requests to implement write operations from the customer device 402. Further, the second data center 406 and the third data center 408 may prevent the customer device 402 from having write operations implemented to the second copy of the domain 414 and the third copy of the domain 416, respectively, based on neither of the second data center 406 and the third data center 408 being assigned as the home region. Therefore, the customer may not perform writes to the domain while the first data center 404 is unavailable, which could be an inconvenience for the customer.

Each of the data centers may have a corresponding IDCP. In the illustrated embodiment, the first data center 404 may have a first IDCP 418, the second data center 406 may have a second IDCP 420, and the third data center 508 may have a third IDCP 422. Each of the first IDCP 418, the second IDCP 420, and the third IDCP 422 may include one or more of the features of the first IDCP 218 (FIG. 2), the first IDCP 318 (FIG. 3), the second IDCP 220 (FIG. 2), the second IDCP 320 (FIG. 3), the third IDCP 222 (FIG. 2), and/or the third IDCP 322 (FIG. 3). Each of the IDCPs may store information related to the customer, such as a data center that has been assigned the home region assignment. In the illustrated embodiment, the first IDCP 418 may be unavailable. Accordingly, the customer device 402, the second data center 406, and the third data center 408 may be unable to access the first IDCP 418 while the first IDCP 418 is unavailable.

The corresponding data center may access the corresponding IDCP to retrieve the information related to the customer. For example, the first IDCP 418, the second IDCP 420, and the third IDCP 422 may store an indication that the first data center 404 is assigned the home region assignment in the illustrated embodiment, thereby causing the first data center 404 to be assigned as the home region. The first data center 404 may access the first IDCP 318 to determine that the first data center 404 is assigned the home region assignment, the second data center 406 may access the second IDCP 320 to determine that the first data center 404 is assigned the home region assignment, and the third data center 408 may access the third IDCP 422 to determine that the first data center 404 is assigned the home region assignment. Each of the data centers may access the corresponding IDCP to determine which data center has been assigned as the home region upon receiving a write operation request. The data center may implement or not implement the write operation request based on which data center is assigned as the home region. For example, the first data center 404 may access the first IDCP 418 to determine that the first data center 404 is assigned as the home region and the first data center 404 may implement the requested write operation to the first copy of the domain 412 based on the first data center 404 being assigned as the home region. The second data center 406 may access the second IDCP 420 to determine that the first data center 404 is assigned as the home region and the second data center 406 may prevent the requested write operation from being implemented to the second copy of the domain 414 based on the second data center 406 not being assigned as the home region. Further, the third data center 408 may access the third IDCP 422 to determine that the first data center 404 is assigned as the home region and the third data center 408 may prevent the requested write operation from being implemented to the third copy of the domain 416 based on the third data center 408 not being assigned as the home region.

The CSP arrangement 400 may include a gateway 410. The gateway 410 may include one or more of the features of the gateway 210 (FIG. 2) and/or the gateway 310 (FIG. 3). The gateway 410 may establish connections between the customer device 402 and the first data center 404, between the customer device 402 and the second data center 406, and between the customer device 402 and the third data center 408. The first data center 404, the second data center 406, and the third data center 408 may each be associated with unique DNS addresses. For example, the first data center 404 may be associated with a first DNS address, the second data center 406 may be associated with a second DNS address, and the third data center 408 may be associated with a third DNS address. The gateway 410 may establish connections and/or route transmissions in accordance with a DNS address included with a connection establishment request and/or a transmission. For example, the gateway 410 may establish connections and/or route transmissions to the first data center 404 based on the first DNS address being provided, may establish connections and/or route transmissions to the second data center 406 based on the second DNS address being provided, and may establish connections and/or route transmissions to the third data center 408 based on the third DNS address being provided.

The customer may request the home region assignment to be reassigned. In the illustrated embodiment, the first data center 404 may be unavailable, whereas the second data center 406 and the third data center 408 may be available when the reassignment of the homer region assignment is requested. For brevity, the reassignment of the home region assignment is described as being performed by the customer device 402 providing the request to the second data center 406 and the second data center 406 performing the reassignment of the home region assignment. It should be understood that the procedure may be performed similarly with any of the available data centers (including the third data center 408). Further, the procedure is described as reassignment of the home region assignment from the first data center 404 to the second data center 406, although it should be understood that the home region assignment may be reassigned to any data center to which the customer is subscribed in other instances.

The customer may input a request to the customer device 402 to change reassign a home region assignment to one of the data centers to which the customer is subscribed. In the described embodiment, the customer may request that the home region assignment be reassigned to the second data center 406. The customer device 402 may generate a request transmission that indicates that the home region assignment is to be reassigned to the second data center 406.

In some embodiments, the customer device 402 may display an option to switch the home region to another data center based on one or more of the data centers becoming unavailable. For example, the customer device 402 may display an option to switch the home region to another data center in response to the data center assigned becoming unavailable. In the illustrated embodiment, the customer device 402 may display an option to switch the home region from the first data center 404 in response to the first data center 404 becoming unavailable. The customer device 402 may have a connection to the home region or one of the other data centers when the first data center 404 becomes unavailable, which could cause the option to be displayed. In some of these embodiments, the option may provide a list of other data centers to which the customer is subscribed that can be assigned the home region assignment. The customer may select a data center from the list to indicate which data center the home region assignment is to be reassigned. In other of these embodiments, the customer may have one or more data centers predefined as back up home regions. The option may indicate the one or more data centers. In instances where one data center is predefined, the option may allow the customer to select whether to reassign the home region assignment to the predefined data center. In instances where more than one data center is predefined, the option may display a list of the predefined data centers and the customer may select a data center from the list to which the home region assignment is to be reassigned. In the described embodiment, the customer device 402 may display an option to switch the home region to the second data center 406 in response to the first data center 404 becoming unavailable.

In some embodiments, the request transmission may include a DNS address corresponding to the data center intended to perform the home region assignment reassignment operation. For example, the request transmission may include the second DNS address corresponding to the second data center 406. The customer device 402 may transmit the request transmission to the gateway 410.

The gateway 410 may establish a connection between the customer device 402 and the second data center 406, as illustrated by transmission line 424 between the gateway 410 and the second data center 406 being solid. The connection may have been previously established based on a request from the customer device 402 to establish the connection or may be established based on the second DNS address corresponding to the second data center 406 included in the request transmission received from the customer device 402. The gateway 410 may provide the request transmission to the second data center 406 based on the connection.

The second data center 406 may receive the request transmission from the gateway 410. Based on the request transmission, the second data center 406 may determine that the home region assignment is to be reassigned to the second data center 406. In particular, since the first data center 404 is currently assigned as the home region, the second data center 406 may determine that the home region assignment is to be reassigned from the first data center 404 to the second data center 406.

Based on the determination that the home region assignment is to be reassigned to the second data center 406, the second data center 406 may update the second IDCP 420 to indicate that the second data center 406 is the home region. For example, the second data center 406 may access the second IDCP 420 and replace the indication that the first data center 404 is assigned the home region assignment with an indication that the second data center 406 is assigned the home region assignment. In some embodiments, the second IDCP 420 may store a field with a value that indicates which data center is the home region, where the reassignment of the home region assignment may cause the value of the field to be updated from a value corresponding to the first data center 404 to a value corresponding to the second data center 406. Once the second IDCP 420 has been updated, the second IDCP 420 may indicate to the second data center 406 that the second data center 406 is the home region when accessed by the second data center 406.

Prior to the update of the home region assignment to the second data center 406, the second data center 406 may not have been assigned as the home region. While the second data center 406 was not assigned as the home region, the second data center 406 may have been prevented from implementing write operations from the customer to the second copy of the domain 414. Once the second IDCP 420 has been updated to indicate that the second data center 406 is assigned as the home region, the second data center 406 may determine that it is the home region based on accessing the second IDCP 420. While the second data center 406 is assigned as the home region, the second data center 406 may be able to implement write operations from the customer to the second copy of the domain 414. Accordingly, the second data center 406 may be able to implement write operations from the customer to the second copy of the domain 414 in response to the second IDCP 420 being updated to indicate that the second data center 406 is assigned the home region assignment.

The second data center 406 may attempt to update the first IDCP 418 to indicate that the second data center 406 is assigned as the home region in some embodiments. In particular, the second data center 406 may attempt to update the first IDCP 418 based on the request. As the first IDCP 418 is unavailable, the second data center 406 may fail to update the first IDCP 418 on the initial attempt. In some of these embodiments, the second data center 406 may wait for an indication that first IDCP 418 has become available and may update the first IDCP 418 in response to the indication that the first IDCP 418 has become available. In other of these embodiments, the second data center 406 may retry to update the first IDCP 418 at set intervals and/or in response to one or more triggers until the second data center 406 has successfully updated the first IDCP 418.

In other embodiments, the second data center 406 may be aware that the first IDCP 418 is unavailable. In some of these embodiments, the second data center 406 may not initially attempt to update the first IDCP 418. For example, the second data center 406 may wait for an indication that the first IDCP 418 is available, or wait until expiration of a set interval or a trigger to attempt to update the first IDCP 418. The second data center 406 may continually to attempt to update the first IDCP 418 at the set intervals and/or in response to triggers until the first IDCP 418 has been successfully updated.

Once the first IDCP 418 has become available, the second data center 406 may update the first IDCP 418 to indicate that the second data center 406 is the home region. For example, the second data center 406 may access the first IDCP 418 and replace the indication that the first data center 404 is assigned the home region assignment with an indication that the second data center 406 is assigned the home region assignment. In some embodiments, the first IDCP 418 may store a field with a value that indicates which data center is the home region, where the reassignment of the home region assignment may cause the value of the field to be updated from a value corresponding to the first data center 404 to a value corresponding to the second data center 406. Once the first IDCP 418 has been updated, the first IDCP 418 may indicate to the first data center 404 that the second data center 406 is the home region when accessed by the first data center 404.

Prior to the update of the home region assignment to the second data center 406, the first data center 404 may have been assigned as the home region. While the first data center 404 was assigned as the home region, the first data center 404 may have been able to implement write operations from the customer to the first copy of the domain 412. Once the first IDCP 418 has been updated to indicate that the second data center 406 is assigned as the home region, the first data center 404 may determine that it is no longer the home region based on accessing the first IDCP 418. While the first data center 404 is not assigned as the home region, the first data center 404 may be prevented from implementing write operations from the customer to the first copy of the domain 412. Accordingly, the first data center 404 may be prevented from implementing write operations from the customer to the first copy of the domain 412 in response to the first IDCP 418 being updated to indicate that the second data center 406 is assigned the home region assignment.

Further, the second data center 406 may update the third IDCP 422 to indicate that the second data center 406 is assigned as the home region. For example, the second data center 406 may transmit a request to the third IDCP 422 to reassign the home region assignment to the second data center 406. In some embodiments, the second data center 406 may transmit the request to the third IDCP 422 via the third data center 408. The indication of the first data center 404 being assigned the home region assignment stored in the third IDCP 422 may be updated to an indication that the second data center 406 is assigned the home region assignment. In some embodiments, the third IDCP 422 may store a field indicating which data center is assigned the home region assignment, where the update causes a value of the field to be updated from the value corresponding to the first data center 404 to the value corresponding to the second data center 406.

The second data center 406 may provide an indication to the customer device 402 that the reassignment of the home region assignment to the second data center 406 has been completed. In some embodiments, the second data center 406 may provide the indication to the customer device 402 upon completion of the update of the second IDCP 420. In other embodiments, the second data center 406 may provide the indication to the customer device 402 in response to the update of all of the available IDCPs (which includes the second IDCP 420 and the third IDCP 422 in the illustrated embodiment) being completed. For example, the second data center 406 may wait to receive indications from the third IDCP 422 that the reassignment of the home region assignment has been completed before providing the indication to the customer device 402. In response to receiving the indication, the customer device 402 may display an indication to the customer that the reassignment of the home region assignment has been completed. In other embodiments, the indication that the reassignment of the home region assignment has been completed may be omitted.

The second data center 406 may further determine whether the copies of the domains match in the subscribed data centers. For example, there may exist differences between the first copy of the domain 412, the second copy of the domain 414, and/or the third copy of the domain 416 in certain instances. The second data center 406 may determine whether there are differences between the first copy of the domain 412, the second copy of the domain 414, and the third copy of the domain 416. In the instances where a data center is unavailable when the home region assignment is reassigned, the data center that is unavailable may have missed updates or may have write operations that were implemented to the corresponding copy of the domain that were not replicated in the copies of the domain in other data centers. In some embodiments, the home region may determine whether the copy of the domain in the home region matches copies of the domains in data centers that were unavailable when the home region assignment was reassigned. For example, the second data center 406 may determine whether there are differences between the first copy of the domain 412 and the second copy of the domain 416 in the illustrated embodiment.

The home region may compare the copy of the domain stored in the home region with copies of the domain stored in other data centers that are available in response to the reassignment of the home region assignment to the home region. For example, the second data center 406 may compare a state of the second copy of the domain 414 with a state of the third copy of the domain 416 in response to being assigned the home region assignment. In some embodiments, the second data center 406 may obtain a snapshot of the second copy of the domain 414 and a snapshot of the third copy of the domain 416. The second data center 406 may compare the snapshot of the second copy of the domain 414 and the snapshot of the third copy of the domain 416 to determine whether there are differences between the second copy of the domain 414 and the third copy of the domain 416.

In instances where one or more data centers are unavailable when the home region assignment is reassigned, the home region may compare the copy of the domain stored in the home region with copies of the domain stored in the data centers that were unavailable after the data centers have become available. For example, the second data center 406 may compare a state of the second copy of the domain 414 with a state of the first copy of the domain 416 after the first data center 404 has become available. In some embodiments, the second data center 406 may obtain a snapshot of the second copy of the domain 414 and a snapshot of the first copy of the domain 412 after the first data center 404 has become available. The second data center 406 may compare the snapshot of the second copy of the domain 414 with the snapshot of the first copy of the domain 412 to determine whether there are differences between the second copy of the domain 414 and the first copy of the domain 416.

In instances where the home region is unavailable when the reassignment of the home region assignment is performed, there may be differences between the copy of the domain stored by the home region and copies of the domain stored by other data centers based on the home region assignment being performed while the home region is unavailable. For example, as the home region replicates the domain to the other data centers at set intervals and/or in response to triggers, there may be write operations that were implemented to the domain that were not replicated to the other data centers prior to the home region becoming unavailable. Further, there may be write operations implemented to the domain in the new home region after the reassignment of the home region assignment that occurred prior to the original home region becoming available again. Additionally, even after the IDCPs of the available data centers have been updated to indicate the new home region, the original home region may receive write operation requests prior to the IDCP corresponding to the original home region being updated by the other data center. As the IDCP corresponding to the original home region still indicates that the original home region is the home region prior to being updated by the other data center, the original home region may improperly determine that it is still assigned the home region assignment based IDCP corresponding to the original home region still indicating that the original home region is the home region and may improperly implement the write operations to the copy of the domain stored by the original home region.

For example, the first data center 404 may have received one or more write operation requests and implement the write operations to the first copy of the domain 412 prior to the first data center 404 becoming unavailable in some instances. However, the first data center 404 may become unavailable prior to the first data center 404 replicating the write operations to the second copy of the domain 414 and the third copy of the domain 416. Accordingly, the first copy of the domain 412 may be different than the second copy of the domain 414 and the third copy of the domain 416 in these instances.

In some instances, the second data center 406 may receive one or more write operation requests and implement the write operations to the second copy of the domain 414 after the second IDCP 420 has been updated and prior to the first data center 404 becoming available. As the first data center 404 was unavailable, the second data center 406 may have been unable to replicate the write operations to the first copy of the domain 412. Accordingly, the first copy of the domain 412 may be different than the second copy of the domain 414 in these instances.

In some instances, the second data center 406 may receive one or more write operation requests and implement the write operations to the first copy of the domain 412 after the first data center 404 has become available and prior to the second data center 406 updating the first IDCP 418. As the second data center 406 and the third data center 408 may prevent the first data center 404 from replicating any write operations implemented to the first copy of the domain 412 due to the first data center 404 not being indicated as the home region by the second IDCP 420 and the third IDCP 422, the second copy of the domain 414 and the third copy of the domain 416 may not have the write operations implemented. Accordingly, the first copy of the domain 412 may be different than the second copy of the domain 414 and the third copy of the domain 416 in these instances.

In instances where the home region determines that there are differences between the copies of the domain stored by the data centers, the home region may consolidate the domains and/or the write operations that caused the differences between the copies of the domains. The home region may perform one or more operations to consolidate the domains and/or the write operations.

In some instances, the second data center 406 may determine that there are differences between the first copy of the domain 412, the second copy of the domain 414, and the third copy of the domain 416. Based on the second data center 406 determining that there are differences, the second data center 406 may cause the customer device 402 to display an indication of the differences as part of the consolidation in some embodiments. Further, the customer device 402 may provide the customer with option to select one of the copies of the domain to be utilized. Based on the selection by the customer, the second data center 406 may cause the selected copy of the domain to be replicated to the other data centers. For example, the customer may select the second copy of the domain 414 as the copy of the domain to be utilized. The second data center 406 may cause the second copy of the domain 414 to be replicated by the first copy of the domain 412 and the third copy of the domain 416.

In some instances, the second data center 406 may determine that there are differences between the first copy of the domain 412 and the second copy of the domain 414. The second data center 406 may determine that the differences were caused by one or more write operations implemented by the first data center 404 to the first copy of the domain 412 prior to the first data center 404 becoming unavailable and that have not been replicated to the second copy of the domain 414. The second data center 406 may determine the write operations that were implemented by the first data center 404 to the first copy of the domain 412 that were not replicated to the second copy of the domain 414. For example, the first data center 404 may store an indication of write operations that were implemented to the first copy of the domain 412 and the second data center 406 may store an indication of write operations that were implemented to the second copy of the domain 414. The second data center 406 may determine, based on the indications, the write operations that were implemented to the first copy of the domain 412 and were not replicated to the second copy of the domain 414.

In some embodiments, the second data center 406 may implement the identified write operations to the second copy of the domain 414 or prevent the identified write operations from being implemented to the second copy of the domain 414 as part of the consolidation. In other embodiments, the second data center 406 may cause the customer device 402 to indicate the identified write operations as part of the consolidation. The customer device 402 may allow the customer to select that all of the identified write operations be implemented to the second copy of the domain 414, none of the identified write operations be implemented to the second copy of the domain 414, or some portion of the identified write operations to be implemented to the second copy of the domain 414. The customer device 402 may indicate the customers selection to the second data center 406 and the second data center 406 may implement or not implement the write operations to the second copy of the domain 414 in accordance with the selection of the customer.

Figure 5:
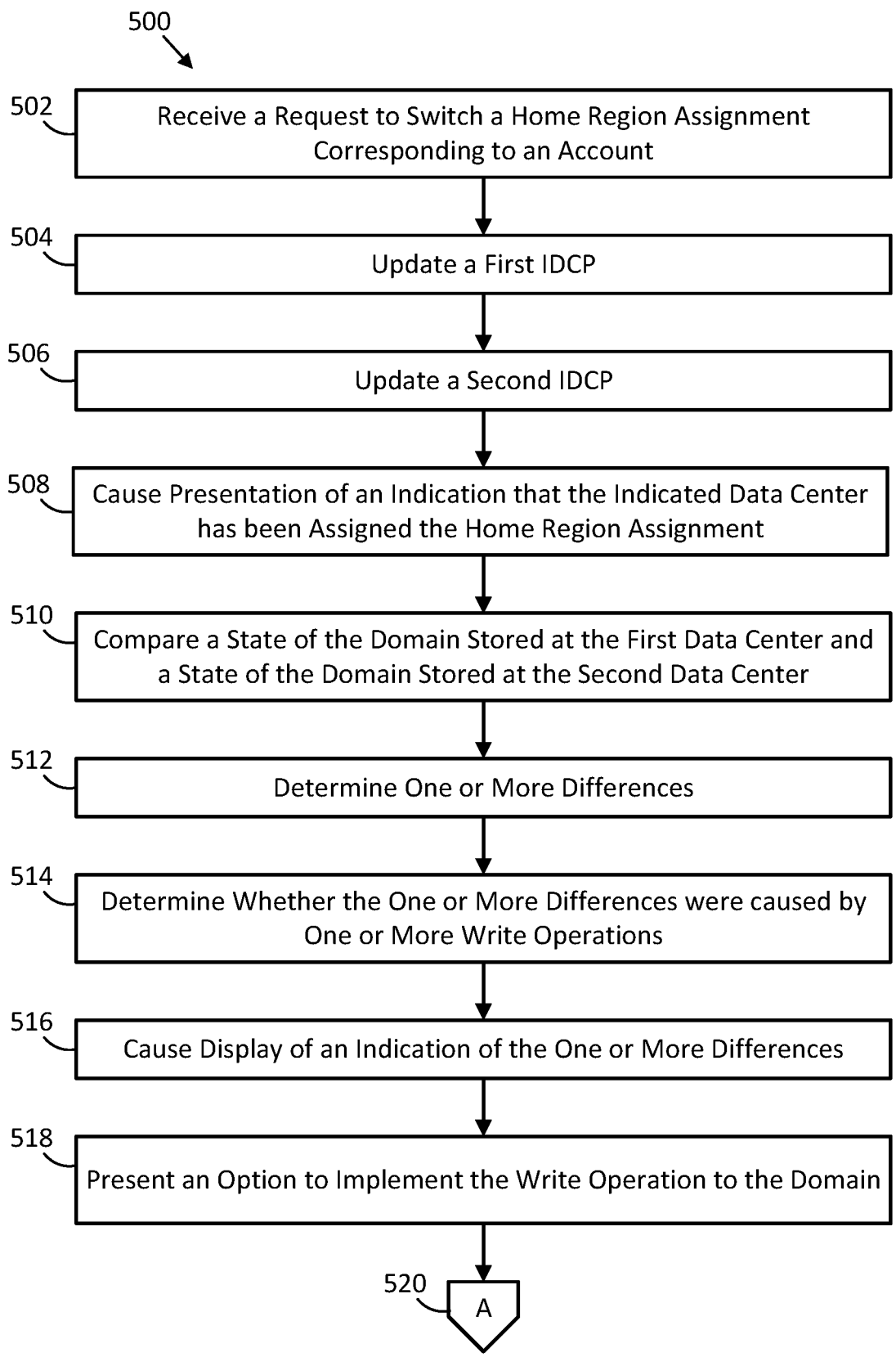
FIG. 5 illustrates a first portion of an example procedure for reassigning a home region assignment, according to at least one embodiment.
Figure 6:
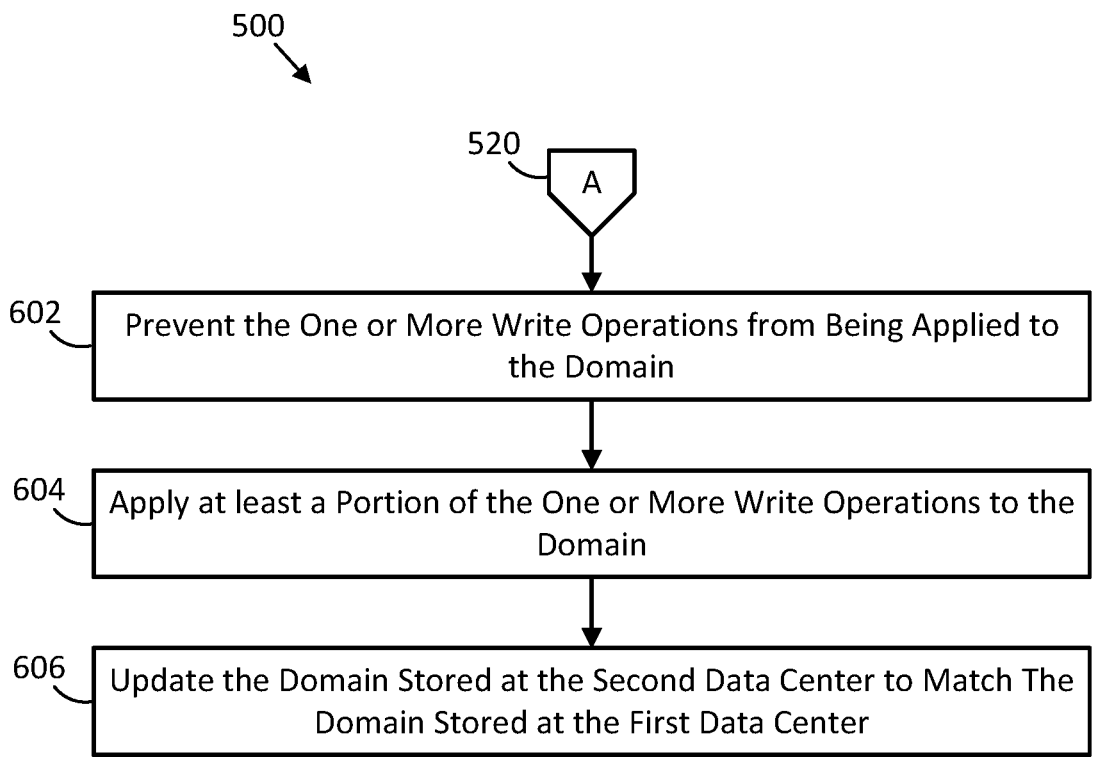
FIG. 6 illustrate a second portion of the example procedure of FIG. 5, according to at least one embodiment.

FIG. 5 illustrates a first portion of an example procedure 500 for reassigning a home region assignment, according to at least one embodiment. FIG. 6 illustrate a second portion of the example procedure 500, according to at least one embodiment. The procedure 500 may be performed to reassign a home region assignment from one data center to another data center. The procedure may be performed by a data center, such as the first data center 204 (FIG. 2), the second data center 206 (FIG. 2), the third data center 208 (FIG. 2), the first data center 304 (FIG. 3), the second data center 306 (FIG. 3), the third data center 308 (FIG. 3), the first data center 404 (FIG. 4), the second data center 406 (FIG. 4), and/or the third data center 408 (FIG. 4).

In 502, the data center may receive a request to switch a home region assignment corresponding to an account. The data center may be a first data center of a CSP located in a first geographic region. The first data center may receive a request to switch a home region assignment corresponding to an account associated with the request to an indicated data center of the cloud service provider indicated within the request. A data center corresponding to the home region assignment being capable of implementing write operations to a domain, such as the first copy of the domain 212 (FIG. 2), the second copy of the domain 214 (FIG. 2), the third copy of the domain 216 (FIG. 2), the first copy of the domain 312 (FIG. 3), the second copy of the domain 314 (FIG. 3), the third copy of the domain 316 (FIG. 3), the first copy of the domain 412 (FIG. 4), the second copy of the domain 414 (FIG. 4), and/or the third copy of the domain 416 (FIG. 4).

In some embodiments, the first data center may receive the request from a customer device, such as the customer device 202 (FIG. 2), the customer device 302 (FIG. 3), and/or the customer device 402 (FIG. 4). The customer device may generate the request based on a customer input of a request to reassign the home region assignment from the first data center to the indicated data center.

In some embodiments, the indicated data center may comprise the first data center. The first data center may be prevented from implementing write operations to the domain prior to a first identity control plane (such as the first IDCP 218 (FIG. 2), the second IDCP 220 (FIG. 2), the third IDCP 222 (FIG. 2), the first IDCP 318 (FIG. 3), the second IDCP 320 (FIG. 3), the third IDCP 322 (FIG. 3), the first IDCP 418 (FIG. 4), the second IDCP 420 (FIG. 4), and/or the third IDCP 422 (FIG. 4)) being updated and may be capable of implementing write operations to the domain at least in response to the first identity control plane being updated.

In some embodiments, the request may indicate that the home region assignment is to be switched from the second data center to the first data center. The second data center may be unavailable when the request is received.

In some embodiments, the request may indicate that the home region assignment is to be switched from the first data center to the second data center. The first data center may update the first identity control plane at a first time and may update the second identity control plane at a second time after the first data center. The first data center may prevent write operations to the domain via the first data center between the first time and the second time. For example, the first data center may prevent write operations based on the first identity control plane being updated to indicate that the second data center is assigned the home region assignment at the first time.

In some embodiments, the request to switch the home region assignment may be received based on a selection to switch the home region assignment from a user interface that indicates a third data center of the cloud service provider located in a third geographic region has become unavailable. The third data center may have been assigned the home region assignment prior to receiving the request. For example, the customer device may display a user interface that provides the option to switch the home region assignment. The customer device may display the user interface in response to the third data center has become unavailable. The user interface may indicate that the third data center has become unavailable.

In 504, the first data center may update a first IDCP. For example, the first data center may update a first IDCP of the first data center to indicate that the indicated data center is assigned the home region assignment for the account. The indicated data center may be capable of implementing write operations to the domain at least in response to the first identity control plane being updated.

In 506, the first data center may update a second IDCP. For example, the second data center may update a second IDCP (such as the first IDCP 218, the second IDCP 220, the third IDCP 222, the first IDCP 318, the second IDCP 320, the third IDCP 322, the first IDCP 418, the second IDCP 420, and/or the third IDCP 422) of a second data center (such as the first data center 204, the second data center 206, the third data center 208, the first data center 304, the second data center 306, the third data center 308, the first data center 404, the second data center 406, and/or the third data center 408) of the CSP located in a second geographic region to indicate that the indicated data center is assigned the home region assignment. In some embodiments, the updating of the second IDCP may be performed at least in response to the second data center becoming available.

In 508, the first data center may cause presentation of an indication that the indicated data center has been assigned the home region assignment. For example, the first data center may cause the customer device to present an indication that the indicated data center has been assigned the home region assignment. The first data center may cause the customer device to present the indication based on the updating of the first IDCP and the second IDCP being completed.

In 510, the first data center may compare a state of the domain stored at the first data center and a state of the domain stored at the second data center. For example, the first data center may compare the state of the domain stored at the first data center and the state of the domain stored at the second data center at least in response to the second data center becoming available. In some embodiments, the first data center may compare a snapshot of the domain stored at the first data center with a snapshot of the domain stored at the second data center. In some embodiments, 510 may be omitted.

In 512, the first data center may determine one or more differences. For example, the first data center may determine one or more differences between the state of the domain stored at the first data center and the state of the domain stored at the second data center. In some embodiments, the first data center may determine the one or more differences based at least in part on the comparing of the state of the domain stored at the first data center and the state of the domain stored at the second data center. In some embodiments, 512 may be omitted.

In 514, the first data center may determine whether the one or more differences were caused by one or more write operations. For example, the first data center may determine whether the one or more differences were caused by one or more write operations implemented by the second data center between a last update of the first data center by the second data center prior to the second data center becoming unavailable and the second data center becoming unavailable. The first data center may determine the one or more write operations based on a comparison of write operations implemented to the domain stored at the first data center and write operations implemented to the domain stored at the second data center. The second data center may replicate the domain to other data centers at set intervals and/or in response to triggers, which may result in time between the last replication of the domain to the first data center and the second data center becoming unavailable. One or more write operations may be implemented by the second data center within this time.

In some embodiments, the first data center may determine that a write operation caused the one or more differences. Further, the first data center may determine that the one or more differences were caused by the one or more write operations implemented by the second data center between the last update of the first data center by the second data center prior to the second data center becoming unavailable and the second data center becoming unavailable. In some embodiments, 514 may be omitted.

In 516, the first data center may cause display of an indication of the one or more differences. For example, the first data center may cause display of an indication of the one or more differences determined in 512. The first data center may cause the indication to be displayed on the customer device. In some embodiments, the first data may cause the display of the indication where the first data center determines that the one or more differences were caused by the one or more write operations implemented by the second data center between the last update of the first data center by the second data center prior to the second data center becoming unavailable and the second data center becoming unavailable. In some embodiments, 516 may be omitted.

In 518, the first data center may present an option to implement the write operation to the domain. For example, the first data center may present the option to implement the write operation to the domain stored at the first data center. The first data center may present the option where the first data center determines a write operation caused the one or more differences. In some embodiments, the first data center may present the option to the customer device, where the customer device may provide an indication of whether the write operation is to be implemented to domain to the first data center. The customer device may provide the indication based on an input from a customer utilizing the customer device. In some embodiments, 518 may be omitted.

The procedure 500 may proceed from 518 to 520. 520 of FIG. 5 may be indicate that the procedure 500 proceeds from 520 of FIGS. 5 to 520 of FIG. 6. Accordingly, the procedure 500 may proceed from 518 of FIGS. 5 to 602 of FIG. 6.

In 602, the first data center may prevent the one or more write operations from being applied to the domain. For example, the first data center may prevent the one or more write operations from being applied to the domain stored at the first data center. The first data center may prevent the one or more write operations from being applied to the domain where the first data center determines that the one or more differences were caused by the one or more write operations implemented by the second data center between the last update of the first data center by the second data center prior to the second data center becoming unavailable and the second data center becoming unavailable. In some embodiments, 602 may be omitted.

In 604, the first data center may apply at least a portion of the one or more write operations to the domain. For example, the first data center may apply at least a portion of the one or more write operations to the domain stored at the first data center. In some embodiments, the first data center may apply at least a portion of the one or more write operations where the first data center determines that the one or more differences were caused by the one or more write operations implemented by the second data center between the last update of the first data center prior to the second data center becoming unavailable and the second data center becoming unavailable. In some embodiments, 604 may be omitted.

In 606, the first data center may update the domain stored at the second data center to match the domain stored at the first data center. For example, the first data center may update the domain stored at the second data center to match the domain stored at the first data center at least in response to the second data center becoming available. In some embodiments, 606 may be omitted.

FIG. 6 may arguably imply an order of the operations of the procedure 500. However, it should be understood that the order of the operations of the procedure 500 may be different and/or that one or more of the operations of the procedure 500 may be performed concurrently in other embodiments. Further, it should be understood that one or more of the operations may be omitted from and/or one or more additional operations may be included in the procedure 500 in other embodiments.

Example Infrastructure as Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
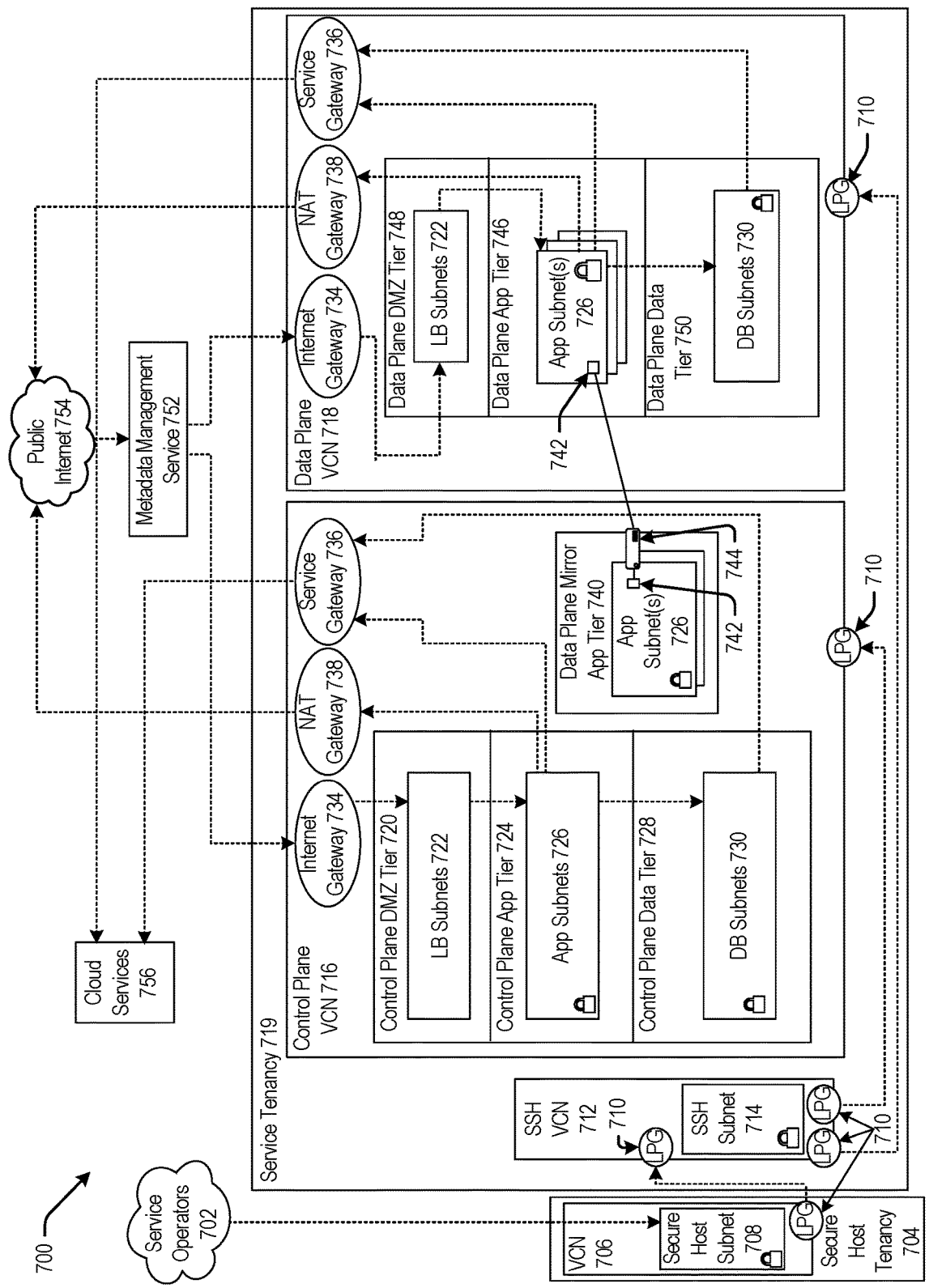
FIG. 7 is a block diagram illustrating one pattern for implementing a cloud infrastructure as a service system, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
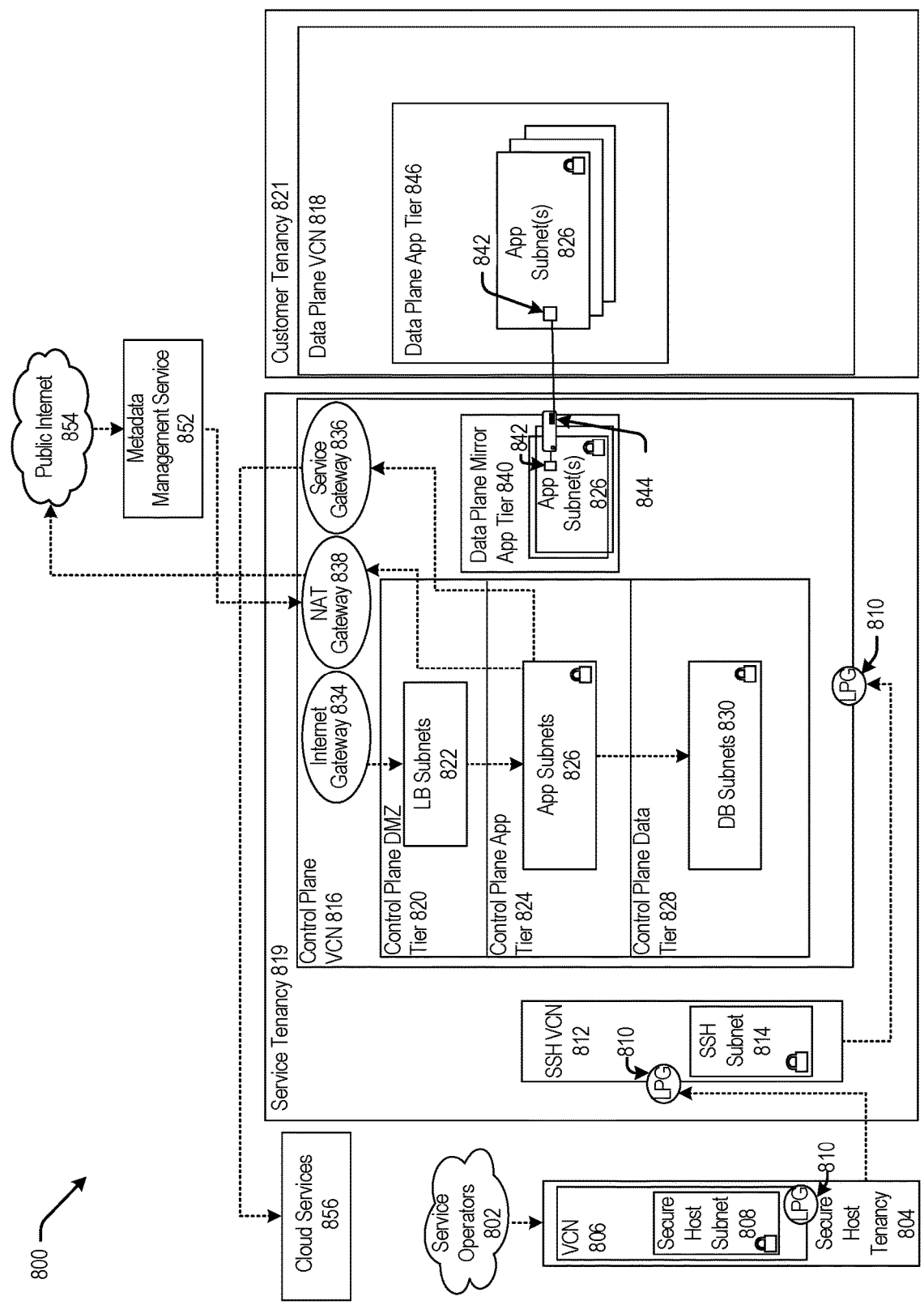
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
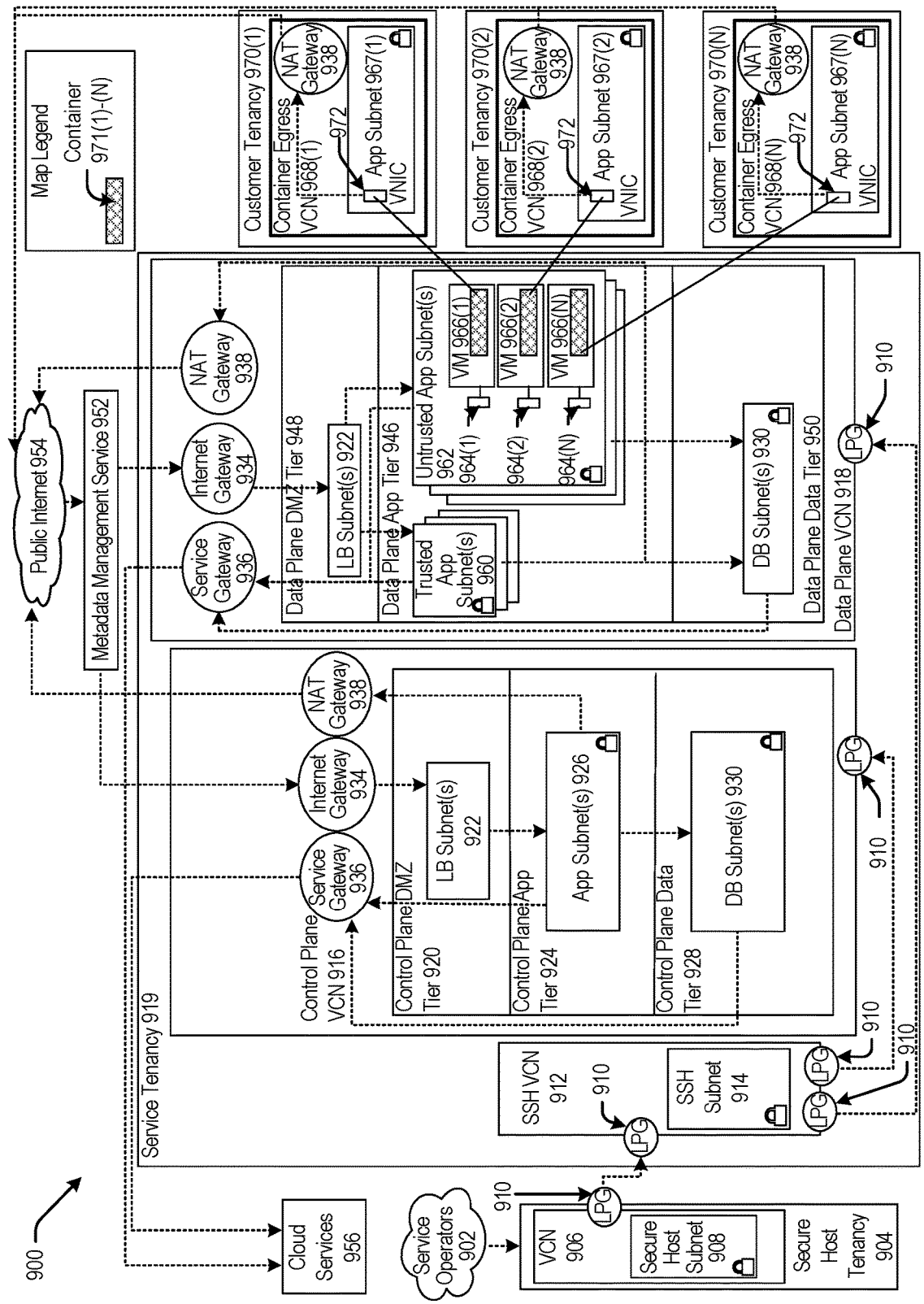
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane VCN 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
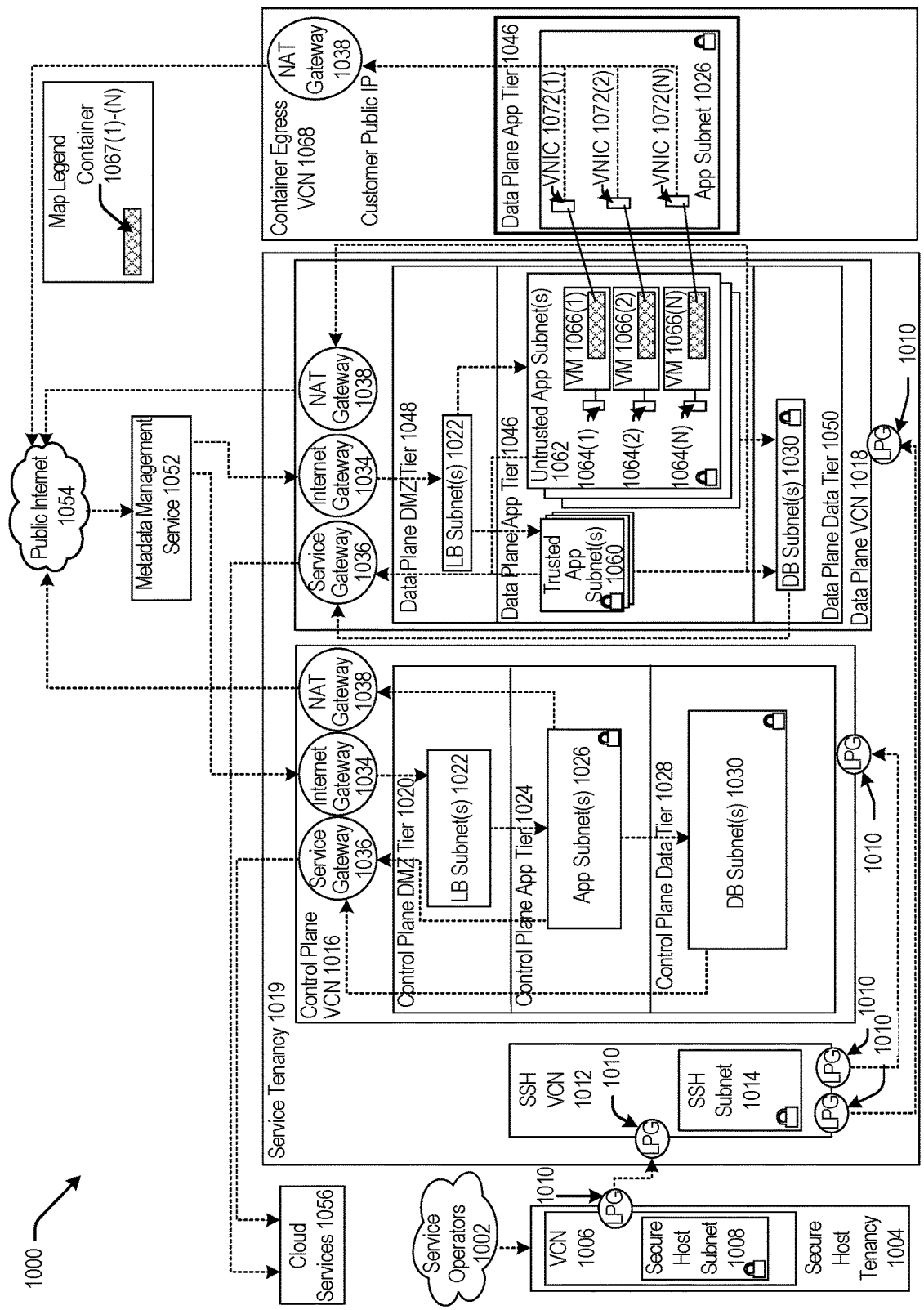
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
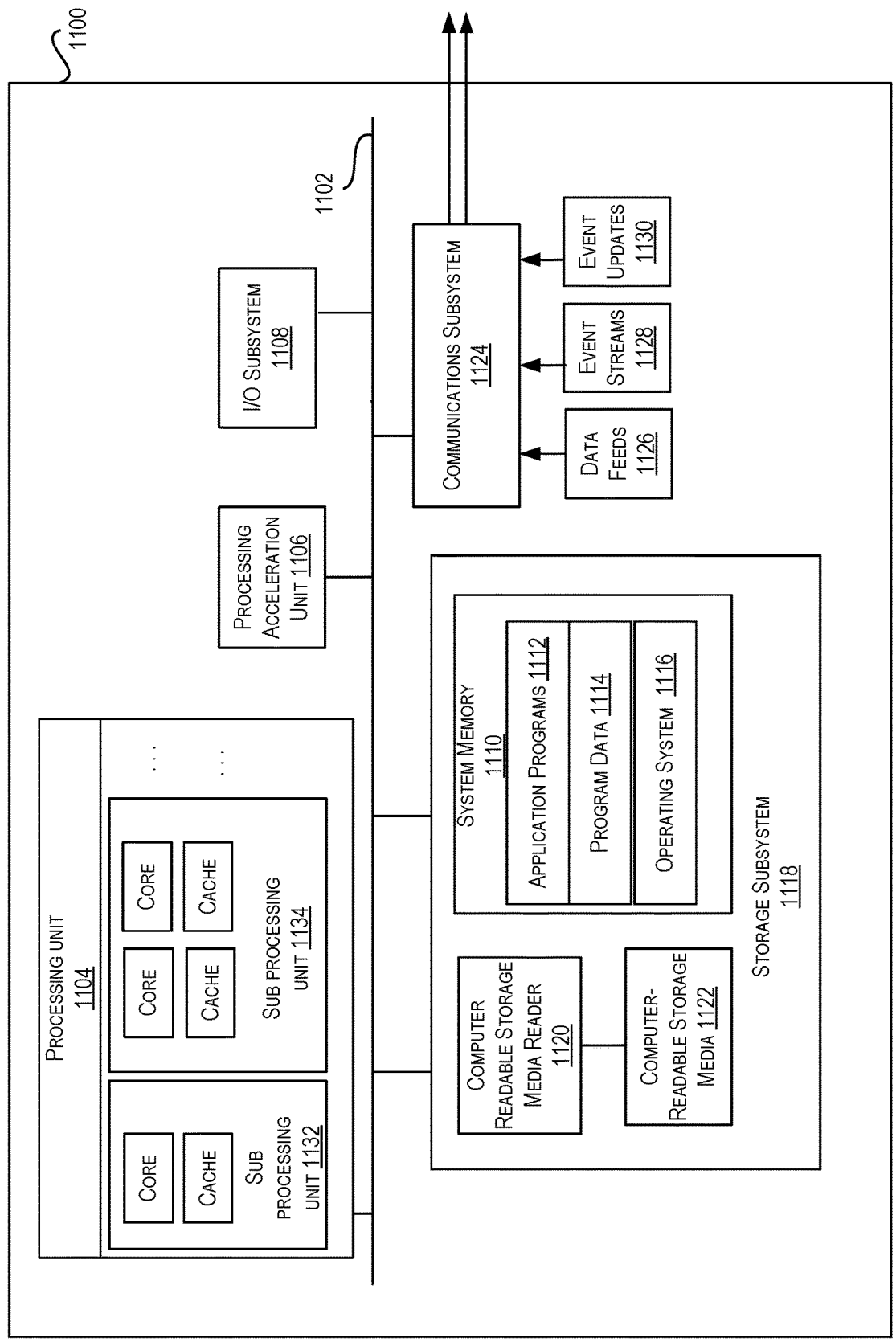
FIG. 11 is a block diagram illustrating an example computer system, according to at least one embodiment.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

EXAMPLES

In the following sections, further exemplary embodiments are provided.

Example 1 may include a method, comprising receiving, by a first data center of a cloud service provider (CSP) located in a first geographic region, a request to switch a home region assignment corresponding to an account associated with the request to an indicated data center of the cloud service provider indicated within the request, a data center corresponding to the home region assignment being capable of implementing write operations to a domain, updating, by the first data center, a first identity control plane (IDCP) of the first data center to indicate that the indicated data center is assigned the home region assignment for the account, the indicated data center being capable of implementing write operations to the domain at least in response to the first identity control plane being updated, updating, by the first data center, a second identity control plane of a second data center of the cloud service provider located in a second geographic region to indicate that the indicated data center is assigned the home region assignment, and causing, by the first data center, presentation of an indication that the indicated data center has been assigned the home region assignment.

Example 2 may include the method of example 1, wherein the indicated data center comprises the first data center, and wherein the first data center is prevented from implementing write operations to the domain prior to the first identity control plane being updated and is capable of implementing write operations to the domain at least in response to the first identity control plane being updated.

Example 3 may include the method of example 1, wherein the request indicates that the home region assignment is to be switched from the second data center to the first data center, wherein the second data center is unavailable when the request is received, and wherein the updating of the second identity control plane is performed at least in response to the second data center becoming available.

Example 4 may include the method of example 3, further comprising comparing, by the first data center, a state of the domain stored at the first data center and a state of the domain stored at the second data center at least in response to the second data center becoming available, determining, by the first data center, one or more differences between the state of the domain stored at the first data center and the state of the domain stored at the second data center, and determining, by the first data center, whether the one or more differences were caused by one or more write operations implemented by the second data center between a last update of the first data center by the second data center prior to the second data center becoming unavailable and the second data center becoming unavailable.

Example 5 may include the method of example 4, wherein the first data center determines a write operation caused the one or more differences, and wherein the method further comprises presenting, by the first data center, an option to implement the write operation to the domain stored at the first data center.

Example 6 may include the method of example 4, wherein the first data center determines that the one or more differences were caused by the one or more write operations implemented by the second data center between the last update of the first data center by the second data center prior to the second data center becoming unavailable and the second data center becoming unavailable, and wherein the method further comprises causing, by the first data center, display of an indication of the one or more differences.

Example 7 may include the method of example 4, wherein the first data center determines that the one or more differences were caused by the one or more write operations implemented by the second data center between the last update of the first data center by the second data center prior to the second data center becoming unavailable and the second data center becoming unavailable, and wherein the method further comprises preventing the one or more write operations from being applied to the domain stored at the first data center.

Example 8 may include the method of example 4, wherein the first data center determines that the one or more differences were caused by the one or more write operations implemented by the second data center between the last update of the first data center by the second data center prior to the second data center becoming unavailable and the second data center becoming unavailable, and wherein the method further comprises applying, by the first data center, at least a portion of the one or more write operations to the domain stored at the first data center.

Example 9 may include the method of example 3, further comprising updating, by the first data center, the domain stored at the second data center to match the domain stored at the first data center at least in response to the second data center becoming available.

Example 10 may include the method of example 1, wherein the request indicates that the home region assignment is to be switched from the first data center to the second data center, wherein the first data center is to update the first identity control plane at a first time, wherein the first data center is to update the second identity control plane at a second time after the first time, and wherein the first data center is to prevent write operations to the domain via the first data center between the first time and the second time.

Example 11 may include the method of example 1, wherein the request to switch the home region assignment is received based on a selection to switch the home region assignment from a user interface that indicates a third data center of the cloud service provider located in a third geographic region has become unavailable, the third data center being assigned the home region assignment prior to receiving the request.

Example 12 may include one or more non-transitory computer-readable media having instructions stored thereon, wherein the instructions, when executed by one or more processors, cause the one or more processors to perform operations comprising receiving a request to switch a home region assignment corresponding to an account associated with the request to an indicated data center of a cloud service provider (CSP) indicated within the request, a data center corresponding to the home region assignment being capable of implementing write operations to a domain, updating a first identity control plane (IDCP) of a first data center of the cloud service provider located in a first geographic region to indicate that the indicated data center is assigned the home region assignment for the account, the indicated data center being capable of implementing write operations to the domain at least in response to the first identity control plane being updated, updating a second identity control plane of a second data center of the cloud service provider located in a second geographic region to indicate that the indicated data center is assigned the home region assignment, and causing presentation of an indication that the indicated data center has been assigned the home region assignment.

Example 13 may include the one or more non-transitory computer-readable media of example 12, wherein the indicated data center comprises the first data center, and wherein the first data center is prevented from implementing write operations to the domain prior to the first identity control plane being updated and is capable of implementing write operations to the domain at least in response to the first identity control plane being updated.

Example 14 may include the one or more non-transitory computer-readable media of example 12, wherein the request indicates that the home region assignment is to be switched from the second data center to the first data center, wherein the second data center is unavailable when the request is received, and wherein the updating of the second identity control plane is performed at least in response to the second data center becoming available.

Example 15 may include the one or more non-transitory computer-readable media of example 14, wherein the instructions, when executed by the one or more processors, further cause the one or more processors to perform operations comprising comparing a state of the domain stored at the first data center and a state of the domain stored at the second data center at least in response to the second data center becoming available, determining one or more differences between the state of the domain stored at the first data center and the state of the domain stored at the second data center, and determining whether the one or more differences were caused by one or more write operations implemented by the second data center between a last update of the first data center by the second data center prior to the second data center becoming unavailable and the second data center becoming unavailable.

Example 16 may include the one or more non-transitory computer-readable media of example 15, wherein a write operation is determined to have caused the one or more differences, and wherein the instructions, when executed by the one or more processors, further cause the one or more processors to perform operations comprising presenting an option to implement the write operation to the domain stored at the first data center.

Example 17 may include the one or more non-transitory computer-readable media of example 15, wherein the one or more write operations implemented by the second data center between the last update of the first data center by the second data center prior to the second data center becoming unavailable and the second data center becoming unavailable are determined to have caused the one or more differences, and wherein the instructions, when executed by the one or more processors, further cause the one or more processors to perform operations comprising causing display of an indication of the one or more differences.

Example 18 may include the one or more non-transitory computer-readable media of example 15, the one or more write operations implemented by the second data center between the last update of the first data center by the second data center prior to the second data center becoming unavailable and the second data center becoming unavailable are determined to have caused the one or more differences, and wherein the instructions, when executed by the one or more processors, further cause the one or more processors to perform operations comprising applying at least a portion of the one or more write operations to the domain stored at the first data center.

Example 19 may include a first data center of a cloud service provider located in a first geographic region, comprising memory to store a domain, and one or more processors coupled to the memory, the one or more processors to receive a request to switch a home region assignment corresponding to an account associated with the request to an indicated data center of a cloud service provider (CSP) indicated within the request, a data center corresponding to the home region assignment being capable of implementing write operations to a domain, update a first identity control plane (IDCP) of the first data center to indicate that the indicated data center is assigned the home region assignment for the account, the indicated data center being capable of implementing write operations to the domain at least in response to the first identity control plane being updated, update a second identity control plane of a second data center of the cloud service provider located in a second geographic region to indicate that the indicated data center is assigned the home region assignment, and cause presentation of an indication that the indicated data center has been assigned the home region assignment.

Example 20 may include the first data center of example 19, wherein the indicated data center comprises the first data center, and wherein the first data center was prevented from implementing write operations to the domain prior to the first identity control plane being updated and is capable of implementing write operations to the domain at least in response to the first identity control plane being updated.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   responsive to receiving a request to switch a home region assignment for an account from a second data center to a first data center:
      updating, by the first data center, a first identity control plane (IDCP) of the first data center to indicate that the first data center is assigned the home region assignment, the first data center being capable of implementing write operations to a domain associated with the account based at least in part on the first data center being assigned the home region assignment; and
      updating, by the first data center, a second identity control plane of the second data center to indicate that the first data center is assigned the home region assignment, the second data center being prevented from implementing write operations to the domain based at least in part on the first data center being assigned the home region assignment.

2. The method of claim 1, wherein the domain comprises an identity domain.

3. The method of claim 1, wherein the domain comprises a container that indicates access information for the account or services that can be provided for the account.

4. The method of claim 1, wherein the account is subscribed to the first data center and the second data center.

5. The method of claim 1, wherein a cloud service provider services the first data center and the second data center.

6. The method of claim 1, wherein the first data center is located in a first geographic region and the second data center is located in a second geographic region.

7. The method of claim 1, wherein the first data center stores a first copy of the domain and the second data center stores a second copy of the domain.

8. The method of claim 1, wherein the request is received in response to the second data center becoming unavailable, and wherein the second identity control plane is updated in response to the second data center becoming available.

9. The method of claim 1, further comprising:
   responsive to receiving the request:
      determining, by the first data center, that a number of requests for home region reassignment within a time period is less than a maximum number of home region reassignments within the time period, the request included in the number of requests, wherein the first identity control plane and the second identity control plane are updated responsive to the determination that the number of requests for home region reassignment is less than the maximum number of home region reassignments.

10. The method of claim 1, wherein updating the first identity control plane comprises updating a first home region assignment indication stored by the first data center to indicate that the first data center is assigned as a home region for the domain, and wherein updating the second identity control plane comprises updating a second home region assignment indication stored by the second data center to indicate that the first data center is assigned as the home region for the domain.

11. The method of claim 1, wherein the first data center or the second data center causes an option to switch the home region assignment to be displayed on a customer device associated with the account, and wherein the request is received in response to a selection of the first data center within the displayed option.

12. One or more non-transitory computer-readable media having instructions stored thereon, wherein the instructions, when executed by one or more processors, cause the one or more processors to perform operations comprising:
   responsive to receiving a request to switch a home region assignment for an account from a second data center to a first data center:
      updating, by the first data center, a first identity control plane (IDCP) of the first data center to indicate that the first data center is assigned the home region assignment, the first data center being capable of implementing write operations to a domain associated with the account based at least in part on the first data center being assigned the home region assignment; and updating, by the first data center, a second identity control plane of the second data center to indicate that the first data center is assigned the home region assignment, the second data center being prevented from implementing write operations to the domain based at least in part on the first data center being assigned the home region assignment.

13. The one or more non-transitory computer-readable media of claim 12, wherein the domain comprises an identity domain.

14. The one or more non-transitory computer-readable media of claim 12, wherein the domain comprises a container that indicates access information for the account or services that can be provided for the account.

15. The one or more non-transitory computer-readable media of claim 12, wherein the first data center is located in a first geographic region and the second data center is located in a second geographic region.

16. The one or more non-transitory computer-readable media of claim 12, wherein the first data center stores a first copy of the domain and the second data center stores a second copy of the domain.

17. The one or more non-transitory computer-readable media of claim 12, wherein the instructions, when executed by the one or more processors, further cause the one or more processors to perform operations comprising:

responsive to receiving the request:
determining, by the first data center, that a number of requests for home region reassignment within a time period is less than a maximum number of home region reassignments within the time period, the request included in the number of requests, wherein the first identity control plane and the second identity control plane are updated responsive to the determination that the number of requests for home region reassignment is less than the maximum number of home region reassignments.

18. A first data center of a cloud service provider, comprising:

memory to store a domain; and one or more processors coupled to the memory, the one or more processors configured to:

responsive to receiving a request to switch a home region assignment for an account from a second data center to the first data center:

updating, by the first data center, a first identity control plane (IDCP) of the first data center to indicate that the first data center is assigned the home region assignment, the first data center being capable of implementing write operations to the domain associated with the account based at least in part on the first data center being assigned the home region assignment; and updating, by the first data center, a second identity control plane of the second data center to indicate that the first data center is assigned the home region assignment, the second data center being prevented from implementing write operations to the domain based at least in part on the first data center being assigned the home region assignment.

19. The first data center of claim 18, wherein the domain comprises a container that indicates access information for the account or services that can be provided for the account.

20. The first data center of claim 18, wherein the first data center is located in a first geographic region and the second data center is located in a second geographic region.

* * * * *